(12) United States Patent
El Hamss et al.

(10) Patent No.: US 12,206,509 B2
(45) Date of Patent: *Jan. 21, 2025

(54) METHODS AND APPARATUS FOR HARQ ENHANCEMENT

(71) Applicant: InterDigital Patent Holdings, Inc., Wilmington, DE (US)

(72) Inventors: Aata El Hamss, Laval (CA); Paul Marinier, Brossard (CA); J. Patrick Tooher, Montreal (CA); Faris Alfarhan, Montréal (CA); Ghyslain Pelletier, Montréal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/506,781

(22) Filed: Nov. 10, 2023

(65) Prior Publication Data

US 2024/0080142 A1 Mar. 7, 2024

Related U.S. Application Data

(63) Continuation of application No. 17/265,602, filed as application No. PCT/US2019/044692 on Aug. 1, 2019, now Pat. No. 11,902,032.

(Continued)

(51) Int. Cl.
*H04L 1/1829* (2023.01)
*H04L 1/1812* (2023.01)

(52) U.S. Cl.
CPC ......... *H04L 1/1864* (2013.01); *H04L 1/1812* (2013.01); *H04L 1/1854* (2013.01)

(58) Field of Classification Search
CPC ... H04L 1/1812; H04L 1/1854; H04L 1/1864; H04L 5/001; H04L 5/0023; H04L 5/0035; H04L 5/0055; H04L 5/0082; H04L 5/0091

See application file for complete search history.

(56) References Cited

U.S. PATENT DOCUMENTS 8,582,638 B2 11/2013 Earnshaw et al.
8,750,143 B2 6/2014 Yin
(Continued)

FOREIGN PATENT DOCUMENTS

CN 101908951 A 8/2010
CN 101989897 A 3/2011
(Continued)

OTHER PUBLICATIONS

Third Generation Partnership Project, "Technical Specification Group Radio Access Network; Evolved Universal Terrestrial Radio Access (E-UTRA); Physical layer procedures (Release 12)," 3GPP TS 36.213 V12.8.0 (Dec. 2015).

(Continued)

*Primary Examiner* — Kashif Siddiqui
(74) *Attorney, Agent, or Firm* — Flaster Greenberg P.C.

(57) ABSTRACT

Method, apparatus, and systems for hybrid automatic repeat request (HARQ) enhancement in wireless communications are disclosed. In one representative embodiment, a method implemented in a wireless transmit/receive unit (WTRU) for wireless communications includes identifying a codebook process from a set of codebook processes based on a first indication, associating a set of bits of hybrid automatic repeat request (HARQ) feedback with the identified codebook process, maintaining the set of bits associated with the identified codebook process based on a condition, receiving a second indication to transmit the set of bits associated with (Continued)

the identified codebook process, and transmitting the set of bits based on the second indication.

20 Claims, 10 Drawing Sheets

Related U.S. Application Data

(60) Provisional application No. 62/788,424, filed on Jan. 4, 2019, provisional application No. 62/715,458, filed on Aug. 7, 2018.

(56) References Cited

U.S. PATENT DOCUMENTS

| | | | |
|---|---|---|---|
| 8,767,647 | B2 | 7/2014 | Heo et al. |
| 9,485,060 | B2 | 11/2016 | Nayeb Nazar et al. |
| 9,584,287 | B2 | 2/2017 | Seo et al. |
| 9,722,735 | B2 | 8/2017 | Shin et al. |
| 10,568,074 | B2 | 2/2020 | Seo et al. |
| 10,601,567 | B2 | 3/2020 | Marinier et al. |
| 10,917,199 | B2 | 2/2021 | Sun et al. |
| 10,972,225 | B2 * | 4/2021 | Khoshnevisan ...... H04L 1/1685 |
| 11,902,032 | B2 * | 2/2024 | El Hamss ............ H04L 1/1854 |
| 2009/0300456 | A1 | 3/2009 | Pelletier et al. |
| 2011/0103323 | A1 | 5/2011 | Wang et al. |
| 2011/0110246 | A1 | 5/2011 | Damnjanovic et al. |
| 2011/0243066 | A1 | 10/2011 | Nayeb Nazar et al. |
| 2011/0249578 | A1 | 10/2011 | Nayeb Nazar et al. |
| 2011/0249656 | A1 | 10/2011 | Cai et al. |
| 2012/0039279 | A1 | 2/2012 | Chen et al. |
| 2012/0218882 | A1 | 8/2012 | Ko et al. |
| 2012/0236812 | A1 | 9/2012 | Chen et al. |
| 2013/0117622 | A1 | 5/2013 | Blankenship et al. |
| 2013/0142134 | A1 | 6/2013 | Dai et al. |
| 2013/0223301 | A1 | 8/2013 | Lee et al. |
| 2014/0226551 | A1 | 8/2014 | Ouchi et al. |
| 2014/0269338 | A1 | 9/2014 | Jung et al. |
| 2014/0369242 | A1 | 12/2014 | Ng et al. |
| 2015/0092702 | A1 | 4/2015 | Chen et al. |
| 2015/0264708 | A1 | 9/2015 | Dai et al. |
| 2015/0365925 | A1 | 12/2015 | Fu et al. |
| 2016/0192388 | A1 | 6/2016 | Ekpenyong et al. |
| 2017/0048052 | A1 | 2/2017 | Lee et al. |
| 2017/0111163 | A1 | 4/2017 | Yang et al. |
| 2017/0273070 | A1 | 9/2017 | Yi et al. |
| 2017/0303267 | A1 | 10/2017 | Shin et al. |
| 2018/0006791 | A1 | 1/2018 | Marinier et al. |
| 2018/0019843 | A1 | 1/2018 | Papasakellariou et al. |
| 2018/0123765 | A1 * | 5/2018 | Cao ....................... H04L 1/1819 |
| 2018/0123769 | A1 | 5/2018 | Pelletier et al. |
| 2018/0167173 | A1 | 6/2018 | Guan et al. |
| 2018/0184418 | A1 | 6/2018 | Takeda et al. |
| 2019/0238275 | A1 | 8/2019 | Sun et al. |
| 2021/0167900 | A1 * | 6/2021 | Karaki ................. H04L 5/0055 |
| 2021/0360616 | A1 * | 11/2021 | Yi ......................... H04L 5/0012 |
| 2022/0095351 | A1 * | 3/2022 | Baldemair ............ H04L 1/1887 |
| 2022/0304020 | A1 * | 9/2022 | Park ....................... H04L 5/001 |
| 2023/0232239 | A1 * | 7/2023 | Balasubramanian ...................... H04W 72/23 726/4 |

FOREIGN PATENT DOCUMENTS

| | | |
|---|---|---|
| CN | 102088343 A | 8/2011 |
| CN | 102812658 A | 5/2012 |
| CN | 102511143 A | 6/2012 |
| CN | 102577209 A | 7/2012 |
| CN | 102714580 A | 10/2012 |
| CN | 102763361 A | 10/2012 |
| CN | 102959890 A | 3/2013 |
| CN | 103119884 A | 5/2013 |
| CN | 103168441 A | 6/2013 |
| CN | 103299571 A | 9/2013 |
| CN | 103796327 A | 9/2015 |
| CN | 107409014 A | 11/2017 |
| CN | 105594286 B | 1/2019 |
| EP | 2806593 A1 | 11/2014 |
| EP | 3493437 A1 | 6/2019 |
| JP | 2012526473 A | 10/2012 |
| JP | 2012531114 A | 12/2012 |
| JP | 2013077926 A | 4/2013 |
| JP | 2015512174 A | 4/2015 |
| JP | 2019528619 A | 10/2019 |
| WO | WO 2011085230 A2 | 9/2011 |
| WO | WO 2011148319 A1 | 12/2011 |
| WO | WO 2016163759 A1 | 10/2016 |
| WO | WO 2016208680 A1 | 12/2016 |
| WO | WO 2018028413 A1 | 2/2018 |

OTHER PUBLICATIONS

"Priority rules for CSI feedback for eCA," 3GPP TSG RAN WG1 #82, R1-154120, Beijing, China (Aug. 24-28, 2015).

Third Generation Partnership Project, "Technical Specification Group Radio Access Network; Evolved Universal Terrestrial Radio Access (E-UTRA); Multiplexing and channel coding (Release 12)," 3GPP TS 36.212 V13.0.0 (Dec. 2015).

"Power control for up to 32 component carriers," 3GPP TSG RAN WG1 Meeting #80bis, R1-151875, Belgrade, Serbia (Apr. 20-24, 2015).

LG Electronics: "Necessary mechanisms and enhancements to support CA of up to 32 carriers", 3GPP Draft; R1-150207 ECA Overall for Massive CA Final, 3rd Generation Partnership Project (3GPP), Mobile Competence Centre; 650, Route Des Lucioles ; F-06921 Sophia-Antipolis Cedex; France, vol. RAN WG1 , No. Athens, Greece; Feb. 09, 2015-Feb. 13, 2015; Feb. 8, 2015 (Feb. 8, 2015), Retrieved from the Internet: URL:http://www.3gpp.org/ftp/Meetings_3GPP SYNC/RAN1/Docs/ [retrieved on Feb. 8, 2015].

Interdigital Communications, "HARQ-ACK reporting for up to 32 carriers," 3GPP TSG-RAN WG1 Meeting #80bis, R1-152099, Belgrade, Serbia (Apr. 20-24, 2015).

Third Generation Partnership Project, "Technical Specification Group Radio Access Network; Evolved Universal Terrestrial Radio Access (E-UTRA); Radio Resource Control (RRC); Protocol specification (Release 12)," 3GPP TS 36.331 V12.8.0 (Dec. 2015).

"Power control to support up to 32 component carriers," 3GPP TSG RAN WG1 Meeting #81, R1-152465, Fukuoka, Japan (May 25-29, 2015).

Huawei, et al. "HARQ enhancements in NR unlicensed", 3GPP draft R1-1805918, 3GPP TSG RAN WG1 Meeting #93, Busan, Korea, May 21-25, 2018,5 pages.

Third Generation Partnership Project, "Technical Specification Group Radio Access Network; Evolved Universal Terrestrial Radio Access (E-UTRA); Multiplexing and channel coding (Release 12)," 3GPP TS 36.212 V12.7.0 (Dec. 2015).

Interdigital Communications, "Remaining aspects of dynamic HARQ-ACK codebook adaptation," 3GPP TSG-RAN WG1 Meeting #83, R1-157140, Anaheim, California, USA (Nov. 15-22, 2015).

Ericsson, "CSI reporting for TDD-FDD CA", 3GPP Tdoc R1-135652, 3GPP TSG RAN WG1 Meeting #75, San Francisco, USA, Nov. 11-15, 2013, 5 pages.

Interdigital Communications, "HARQ-ACK codebook determination," 3GPP TSG-RAN WG1 Meeting #82, R1-154309, Beijing, China (Aug. 24-28, 2015).

Ericsson, "Introduction of Rel-13 eCA," Change Request 36.211 CR 0208 rev 1, Current version: 12.7.0, 3GPP TSG-RAN WG1 Meeting #83, R1-157912, Anaheim, USA (Nov. 15-22, 2015).

Third Generation Partnership Project, "Technical Specification Group Radio Access Network; Evolved Universal Terrestrial Radio Access (E-UTRA); Physical layer procedures (Release 12)," 3GPP TS 36.213 V12.1.0 (Mar. 2014).

Third Generation Partnership Project, "Technical Specification Group Radio Access Network; Evolved Universal Terrestrial Radio Access (E-UTRA); Radio Resource Control (RRC); Protocol specification (Release 12)," 3GPP TS 36.331 V12.4.1 (Dec. 2014).

(56) References Cited

OTHER PUBLICATIONS

Interdigital Communications, "Enabling LTE carrier aggregation of up to 32 component carriers," 3GPP TSG-RAN WG1 #80, R1-150537, Athens, Greece (Feb. 9-13, 2015).
Anonymous, "Study on NR-based Access to Unlicensed Spectrum", 3rd Generation Partnership Project (3GPP), 3GPP TSG RAN Meeting #77, Document: RP-172021, Sapporo, Japan, Sep. 11, 2017, 5 pages.
Third Generation Partnership Project, "Technical Specification Group Radio Access Network; Evolved Universal Terrestrial Radio Access (E-UTRA); Physical channels and modulation (Release 12)," 3GPP TS 36.211 V13.0.0 (Dec. 2015).
Third Generation Partnership Project, "Technical Specification Group Radio Access Network; NR; Physical layer procedures for control (Release 15)," 3GPP TS 38.213 V15.0.0 (Dec. 2017).
MCC Support, "Final Report of 3GPP TSG RAN WG1 #81 v1.0.0 (Fukuoka, Japan, May 25-29, 2015)," 3GPP TSG RAN WG1 Meeting #82, R1-153701, Beijing, China (Aug. 24-28, 2015).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," 3GPP TS 36.300 V12.4.0 (Dec. 2014).
Third Generation Partnership Project, "Technical Specification Group Radio Access Network; Evolved Universal Terrestrial Radio Access (E-UTRA); Services provided by the physical layer (Release 13)," 3GPP TS 36.302 V12.6.0 (Dec. 2015).
Third Generation Partnership Project, "Technical Specification Group Radio Access Network; Evolved Universal Terrestrial Radio Access (E-UTRA); Physical channels and modulation (Release 12)," 3GPP TS 36.211 V12.1.0 (Mar. 2014).
Third Generation Partnership Project, "Technical Specification Group Radio Access Network; Evolved Universal Terrestrial Radio Access (E-UTRA); Multiplexing and channel coding (Release 12)," 3GPP TS 36.212 V12.3.0 (Dec. 2014).
"3rd Generation Partnership Project; Technical Specification Group Radio Access Network; Study on Licensed-Assisted Access to Unlicensed Spectrum; (Release 13)", 3GPP TR 36.889 V13.0.0, Jun. 2015, 285 pages.
"Remaining issues for PUCCH on Scell," 3GPP TSG RAN WG1 Meeting #81, R1-152461, Fukuoka, Japan (May 25-29, 2015).
Huawei et al., "Power control for up to 32 component carriers," 3GPP TSG RAN WG1 Meeting #80bis, R1-151875, Belgrade, Serbia (Apr. 20-24, 2015).
TS 38.321 V15.1.0, "Technical Specification Group Radio Access Network, NR, Medium Access Control (MAC) Protocol Specification (Release 15)", Mar. 2018, pp. 1-67.
Third Generation Partnership Project, "Technical Specification Group Radio Access Network; Evolved Universal Terrestrial Radio Access (E-UTRA); Radio Resource Control (RRC); Protocol specification (Release 12)," 3GPP TS 36.331 V13.0.0 (Dec. 2015).
Samsung, "Priority rules for CSI feedback for eCA," 3GPP TSG RAN WG1 #82, R1-154120, Beijing, China (Aug. 24-28, 2015).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," 3GPP TS 36.300 V12.8.0 (Dec. 2015).
Nokia Corporation, "New WI proposal: LTE Carrier Aggregation Enhancement Beyond 5 Carriers," 3GPP TSG RAN Meeting #66, RP-142286, Maui, Hawaii (Dec. 8-11, 2014).
ZTE, "Summary on Multiple TB scheduling enhancement for Nb-Iot", 3GPP Tdoc R1-1813757, 3GPP TSG-RAN WG1 Meeting #95, Spokane, USA, Nov. 12-16, 2018, 11 pages.
Interdigital Communications, "HARQ-ACK codebook determination," 3GPP TSG-RAN WG1 Meeting #82bis, R1-155527, Malmö, Sweden (Oct. 5-9, 2015).
Huawei, "Introduction of Rel 13 feature of eCA," 3GPP TSG-RAN WG1 Meeting #83, Change Request 36.212 CR 0178 rev 1, Current version: 12.6.0, R1-157915, Anaheim, USA (Nov. 15-22, 2015).
Third Generation Partnership Project, "Technical Specification Group Radio Access Network; Evolved Universal Terrestrial Radio Access (E-UTRA); Services provided by the physical layer (Release 13)," 3GPP TS 36.302 V13.0.0 (Dec. 2015).
Third Generation Partnership Project, "Technical Specification Group Radio Access Network; Evolved Universal Terrestrial Radio Access (E-UTRA); Physical channels and modulation (Release 12)," 3GPP TS 36.211 V12.8.0 (Dec. 2015).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," 3GPP TS 36.300 V13.2.0 (Dec. 2015).
Samsung, "PUCCH Power Control in eCA", 3GPP Tdoc R1-156752, 3GPP TSG-RAN WG1 Meeting #83, Anaheim, USA, Nov. 16-20, 2015, 4 pages.
CATT, "Details on ACK/NAK transmission for CA," 3GPP TSG RAN WG1 Meeting #62, R1-104313, Madrid, Spain (Aug. 23-27, 2010).
Third Generation Partnership Project, "Technical Specification Group Radio Access Network; Evolved Universal Terrestrial Radio Access (E-UTRA); Physical layer procedures (Release 12)," 3GPP TS 36.213 V12.4.0 (Dec. 2014).
"On HARQ-ACK Feedback Enhancements" 3GPP Draft; R1-154444 ECA HARQ, 3RD Generation Partnership Project, Mobile Competence Centre; 650, Route Des Lucioles; F-06921, Sophia-Antipolis Cedex; France, vol. RAN WG1 Beijing, P.R China; Aug. 24, 2015-Aug. 28, 2015 Aug. 23, 2015.
"Dynamic adaptation of PUCCH formats for HARD-ACK feedback " 3GPP Draft; R1-155093, 3rd Generation Partnership Project, Mobile Competence Centre; 650, Route Des Lucioles; F-06921, Sophia-Antipolis Cedex; France, vol. RAN WG1 No. Malmo, Sweden; Oct. 5, 2015-Oct. 9, 2015 Sep. 26, 2015.
Intel Corporation, "Scheduling of Multiple DL/UL TBs for eMTC", 3GPP Tdoc R1-1813688, 3GPP TSG RAN WG1 Meeting #94bis, Spokane, USA, Nov. 12-16, 2018, 4 pages.
Third Generation Partnership Project, "Technical Specification Group Radio Access Network; Evolved Universal Terrestrial Radio Access (E-UTRA); Physical layer; Measurements (Release 12)," 3GPP TS 36.214 V12.2.0 (Mar. 2015).
Third Generation Partnership Project, "Technical Specification Group Radio Access Network; Evolved Universal Terrestrial Radio Access (E-UTRA); Physical layer; Measurements (Release 12)," 3GPP TS 36.214 V12.1.0 (Dec. 2014).
Third Generation Partnership Project, "Technical Specification Group Radio Access Network; Evolved Universal Terrestrial Radio Access (E-UTRA); Multiplexing and channel coding (Release 12)," 3GPP TS 36.212 V12.0.0 (Dec. 2013).
Motorola Mobility, "Introduction of eCA," Change Request 36.213 CR 0539 rev-, Current version: 12.7.0, 3GPP TSG-RAN WG1 Meeting #83, R1-15xxx, Anaheim, USA (Nov. 15-22, 2015).
Huawei et al., "Remaining issues for PUCCH on Scell," 3GPP TSG RAN WG1 Meeting #81, R1-152461, Fukuoka, Japan (May 25-29, 2015).
Ericsson et al., "Evaluation of PUCCH Proposals for Carrier Aggregation," 3GPP TSG-RAN WG1 #60bis, R1-101731, Beijing, China (Apr. 12-16, 2010).
Third Generation Partnership Project, "Technical Specification Group Radio Access Network; Study on Licensed-Assisted Access to Unlicensed Spectrum; (Release 13)," 3GPP TR 36.889 V0.1.1 (Nov. 2014).
Third Generation Partnership Project, "Technical Specification Group Radio Access Network; Evolved Universal Terrestrial Radio Access (E-UTRA); Physical channels and modulation (Release 12)," 3GPP TS 36.211 V12.4.0 (Dec. 2014).
Third Generation Partnership Project, "Technical Specification Group Radio Access Network; Evolved Universal Terrestrial Radio Access (E-UTRA); Physical layer; Measurements (Release 13)," 3GPP TS 36.214 V13.0.0 (Dec. 2015).
Interdigital Communications, "HARQ-ACK reporting for aggregation of up to 32 carriers," 3GPP TSG-RAN WG1 Meeting #81, R1-153081, Fukuoka, Japan (May 25-29, 2015).

(56) References Cited

OTHER PUBLICATIONS

Nokia Corporation, NTT DoComo Inc., Nokia Networks, "New WI proposal: LTE Carrier Aggregation Enhancement Beyond 5 Carriers," 3GPP TSG RAN #66 RP-142286, Dec. 11, 2014.

Third Generation Partnership Project, "Technical Specification Group Radio Access Network; Evolved Universal Terrestrial Radio Access (E-UTRA); Physical layer procedures (Release 12)," 3GPP TS 36.213 V13.0.0 (Dec. 2015).

Huawei et al., "Power control to support up to 32 component carriers," 3GPP TSG RAN WG1 Meeting #81, R1-152465, Fukuoka, Japan (May 25-29, 2015).

Third Generation Partnership Project, "Technical Specification Group Radio Access Network; Evolved Universal Terrestrial Radio Access (E-UTRA); Services provided by the physical layer (Release 13)," 3GPP TS 36.302 V12.2.0 (Dec. 2014).

Dahlman, et al., "4G LTE/LTE-Advanced for Mobile Broadband; Academic Press Second Edition", 2014, 509 pages.

Third Generation Partnership Project,"WF on Periodic CSI reporting configuration", Nokia Networks, Lenovo, Samsung, Ericsson, NTT DOCOMO, Huawei, HiSilicon, Intel, LGE, NEC, 3GPP TSG RANWG1 #82bis, R1-156372, Malmö, Sweden, Oct. 5-9, 2015, 3 pages.

* cited by examiner

TABLE 320

| Values | Unit |
|---|---|
| First codepoint | K₁ | Slots |
| Second codepoint | K₂ | Slots |
| Third codepoint | K₃ | COT(s) |
| Fourth codepoint | K₄ | COT(s) |

TABLE 330

| Values | Unit |
|---|---|
| First codepoint | K₁ | COT(s) and Slots |
| Second codepoint | K₂ | COT(s) and Slots |
| Third codepoint | K₃ | COT(s) and Slots |
| Fourth codepoint | K₄ | COT(s) and Slots |

FIG. 3B

METHODS AND APPARATUS FOR HARQ ENHANCEMENT

CROSS REFERENCE TO RELATED APPLICATIONS

This application is continuation application of U.S. application Ser. No. 17/265,602 filed Feb. 3, 2021, which is a 35 U.S.C. 371 national stage application of International Application No. PCT/US2019/044692 filed Aug. 1, 2019, which is a non-provisional filing of, and claims priority to and the benefit of U.S. Provisional Patent Application No. 62/715,458, filed Aug. 7, 2018, and U.S. Provisional Patent Application No. 62/788,424, filed Jan. 4, 2019, the entire contents of each of which being hereby incorporated by reference as if fully set-forth herein in their respective entirety, for all purposes.

BACKGROUND

Mobile communications continue to evolve. A fifth generation may be referred to as 5G, which may implement an advanced wireless communications system called New Radio (NR). Embodiments disclosed herein generally relate to communication networks, wireless and/or wired. For example, one or more embodiments disclosed herein are related to methods and apparatus for hybrid automatic repeat request (HARQ) enhancement in wireless communications.

BRIEF DESCRIPTION OF THE DRAWINGS

A more detailed understanding may be had from the detailed description below, given by way of example in conjunction with the drawings appended hereto. Figures in the description, are examples. As such, the Figures and the detailed description are not to be considered limiting, and other equally effective examples are possible and likely. Furthermore, like reference numerals in the figures indicate like elements, and wherein:

FIG. 3B are two tables illustrating two examples of reusing one or more PDSCH-to-HARQ timing indicators in downlink control information (DCI), according to one or more embodiments;

DETAILED DESCRIPTION

Communications Networks and Devices

Figure 1A:
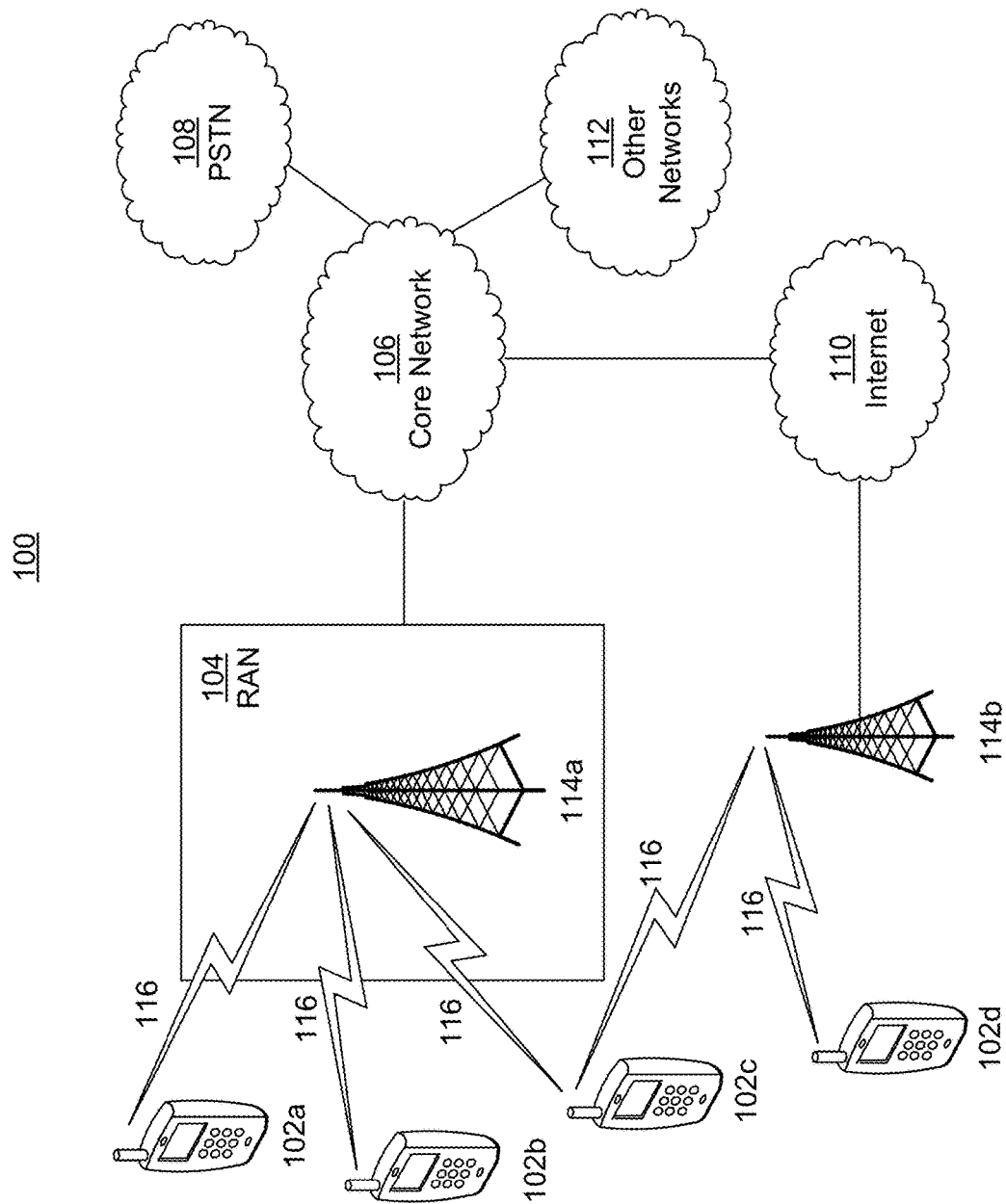
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a New Radio (NR) NodeB, a site controller, an access point (AP), a wireless router, and the like.

While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, e.g., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (e.g., Wireless Fidelity (WiFi), IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, a Home Node B, a Home eNode B, or an access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR, etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
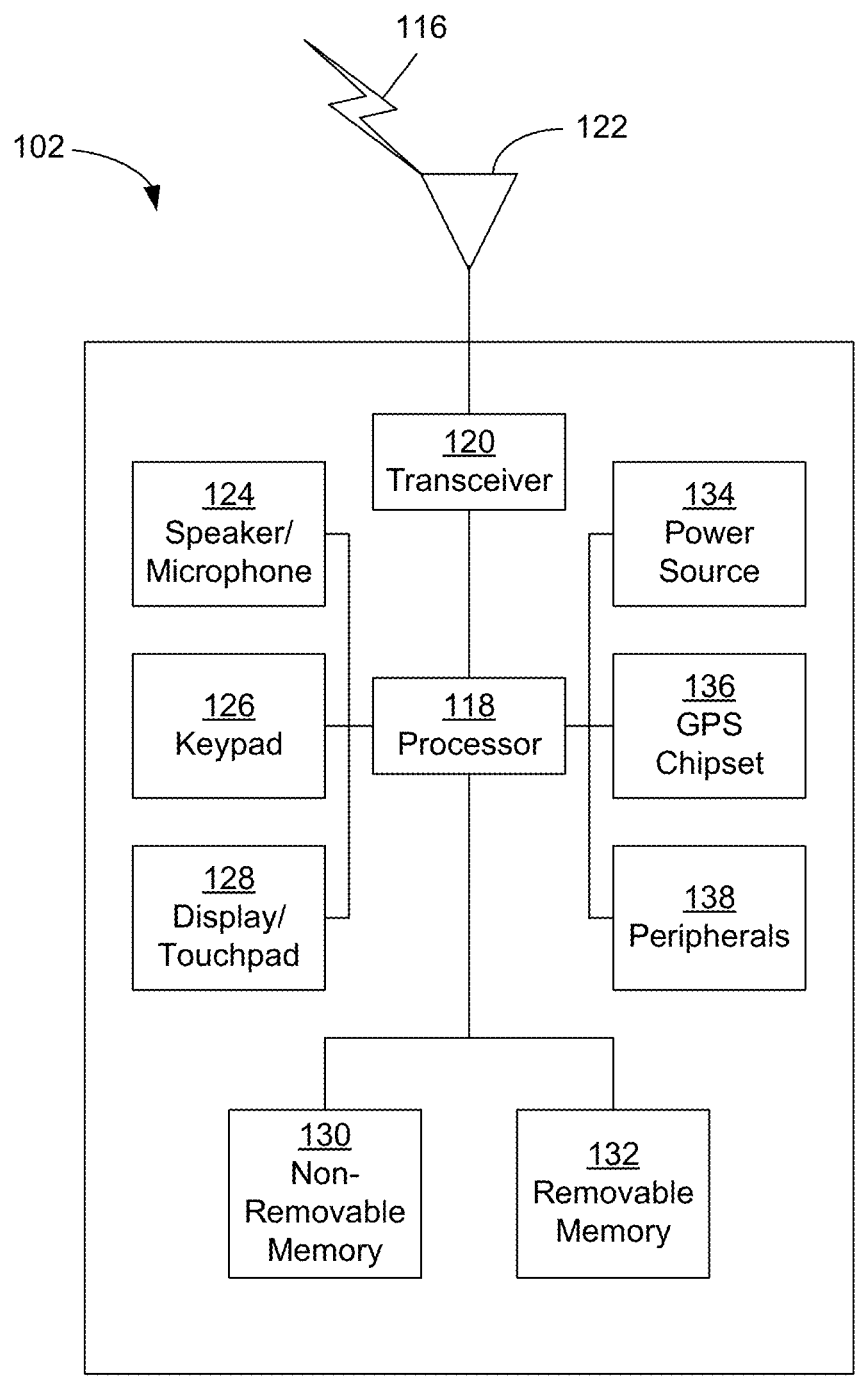
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
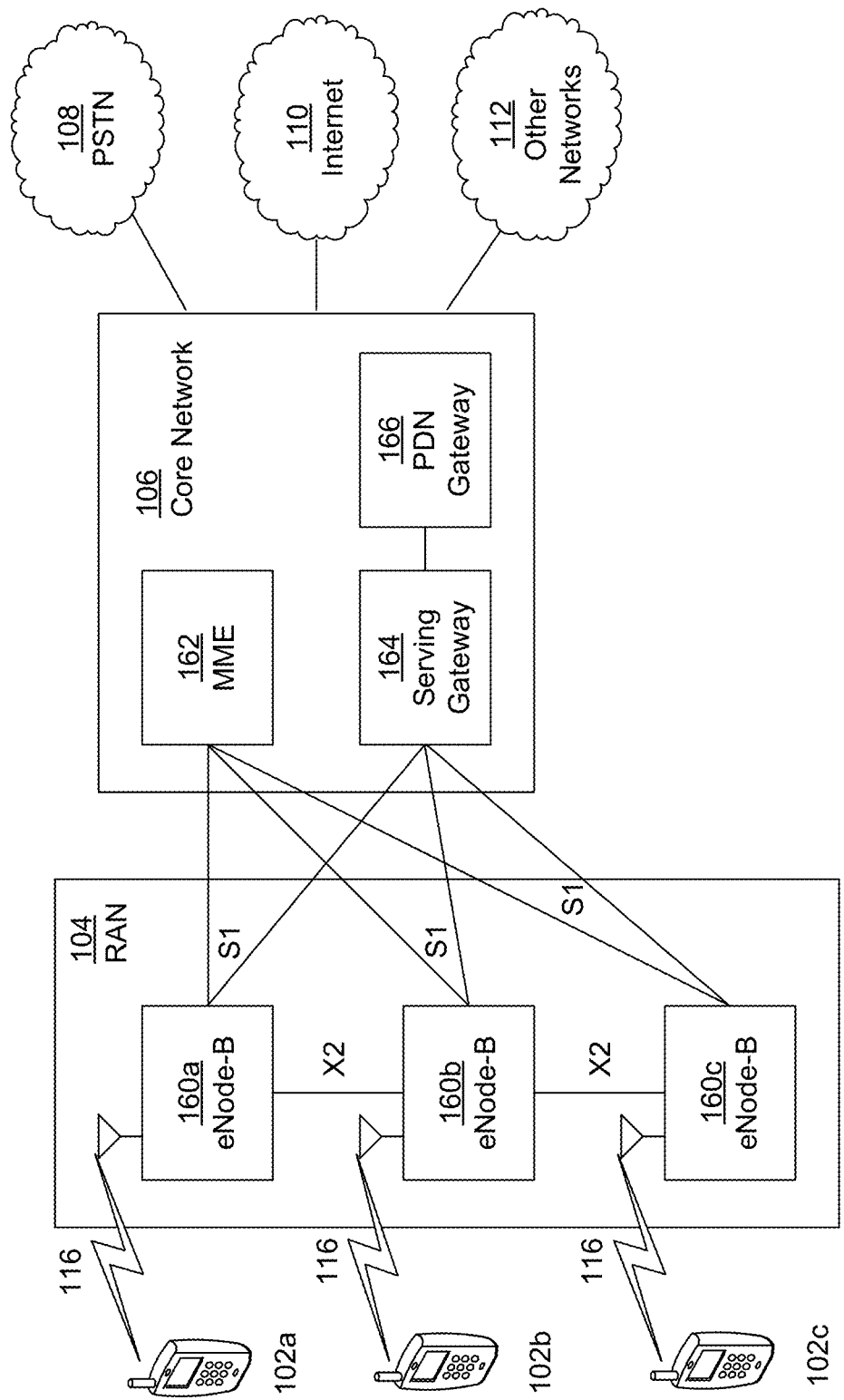
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In some representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
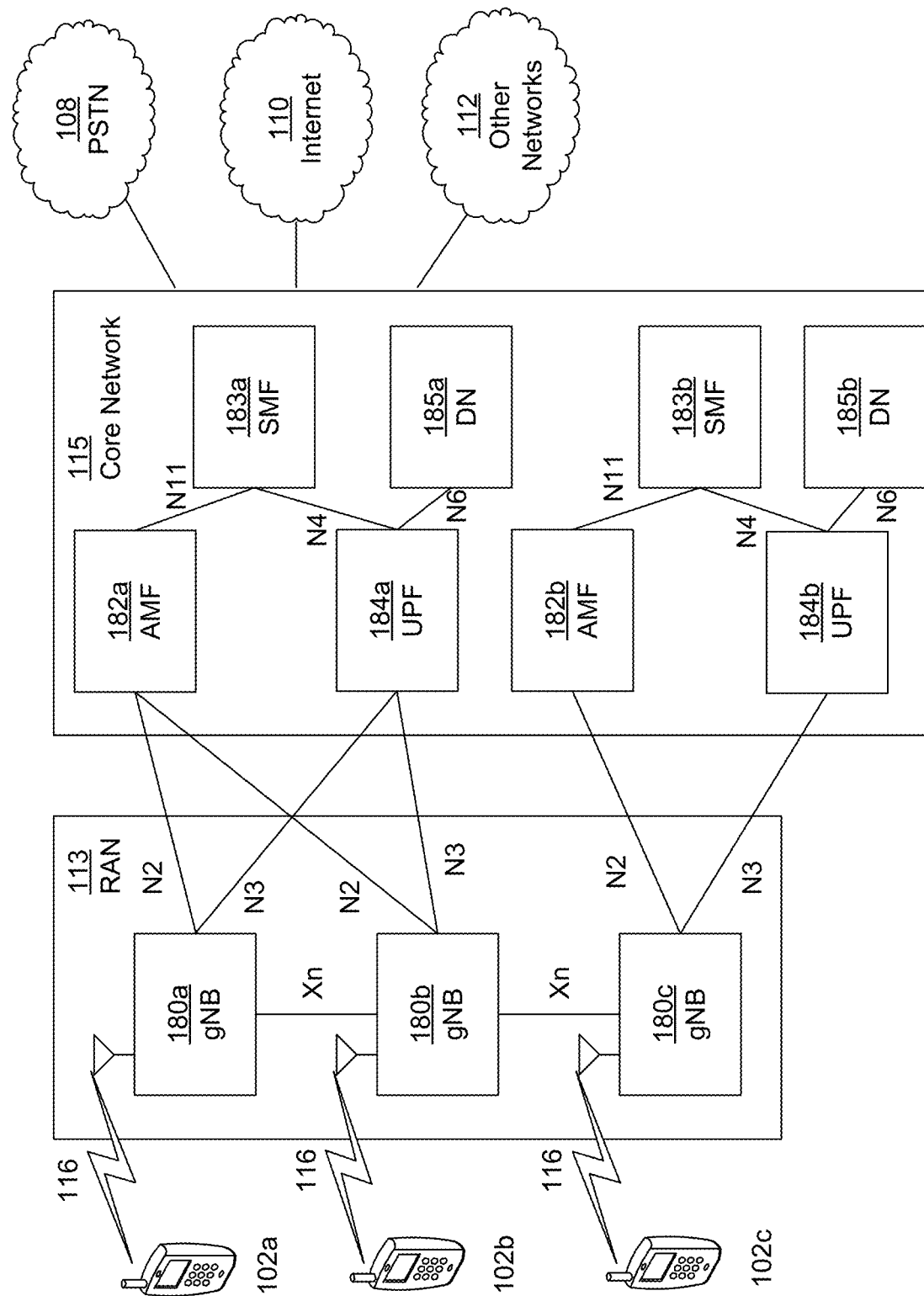
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 182 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating a WTRU or UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Operation(s) in Unlicensed Frequency Band(s)

Operation(s) in an unlicensed frequency band may be subject to requirements as to a Nominal Channel Bandwidth (NCB) and/or Occupied Channel Bandwidth (OCB), which may be defined for unlicensed spectrum, such as in the 5 GHz region. In some examples, the NCB may be the widest band of frequencies (inclusive of guard bands) assigned to a single channel. In some exemplary regulatory schemes, the NCB must be at least 5 MHz, and the OCB, (e.g., the bandwidth containing 99% of the power of the signal) must be between 80% and 100% of the declared NCB. During an established communication, a device may be allowed or configured to operate temporarily in a mode where the OCB may be reduced (e.g., as low as 40% of the NCB).

In some examples, channel access in a licensed or unlicensed frequency band may use a listen-before-talk (LBT) mechanism. In an aspect, LBT may be mandated independently of whether a channel is occupied or not. In an example, an LBT procedure or mechanism may be defined as a mechanism by which an equipment applies a clear channel assessment (CCA) check before using a channel.

In a frame-based system, for example, LBT may be characterized by any of: a CCA time (e.g., ~20 µs), a Channel Occupancy Time (COT) (e.g., minimum 1 ms, maximum 10 ms), an idle period (e.g., minimum 5% of COT), a fixed frame period (e.g., a time period equal to COT+idle period), a short control signaling transmission time (e.g., maximum duty cycle of 5% within an observation period of 50 ms), and/or a CAA energy detection threshold.

In a load-based system, for example, LBT may be characterized by a number, N, corresponding to the number of one or more clear idle slots in CCA or extended CCA (ECCA), instead of the fixed frame period. In other words, an LBT operation may include a CCA or an ECCA, which may be defined in terms of a number of slots (N slots) that needs to be detected as clear and idle before a channel is deemed available. In some examples, the number N may be randomly selected within a pre-determined or pre-configured range. In some cases, for a load-based system, the transmitting and/or receiving structure(s) may be load based, and may not be fixed in time.

Typical deployment scenarios may include any of: one or more (e.g., different) standalone NR-based operations, one or more (e.g., different) variants of a dual connectivity (DC) operation, and/or one or more (e.g., different) variants of carrier aggregation (CA). In one embodiment, different variants of DC operation may include, for example, Evolved-Universal Terrestrial Radio Access-New Radio-Dual Connectivity (EN-DC) having at least one carrier operating according to the LTE radio access technology (RAT), or NR DC with at least two sets of one or more carriers operating according to the NR RAT. In another embodiment, different variants of CA may include, for example, different combinations of zero, one, or more carriers, of each of an LTE or an NR RAT.

For an LTE system, one or more functionalities discussed herein may be considered for a Licensed-Assisted Access (LAA) system. In a first example, LBT (e.g., clear channel assessment) may be used. The CCA utilizes at least energy detection to determine the presence or absence of other signals on a channel to determine whether a channel is occupied. In some cases, European and/or Japanese regulations may mandate the usage of LBT in one or more unlicensed bands. Apart from regulatory requirements, carrier sensing via LBT may be one way for fair sharing of the unlicensed spectrum and hence it may be a vital feature for fair and friendly operation in the unlicensed spectrum in a single global solution framework.

In some examples, for an LTE system, discontinuous transmission may occur on a carrier with limited maximum transmission duration. In unlicensed spectrum, sometimes channel availability may not be guaranteed. In addition, certain regions, such as Europe and Japan, may prohibit continuous transmission and/or impose limits on the maximum duration of a transmission burst in the unlicensed spectrum. Hence, in some cases, discontinuous transmission with limited maximum transmission duration may be a required functionality for LAA.

In some examples, for an LTE system, carrier selection(s) may be configured or used. For instance, unlicensed spectrum may include a large amount of available bandwidth, in this case, carrier selection may be configured or used for LAA nodes to select one or more carriers having low interference and with that, to achieve good co-existence with other unlicensed spectrum deployments.

WTRU Operations in New Radio (NR)

In NR, a WTRU may operate using bandwidth parts (BWPs) in a carrier. For example, a WTRU may first access a cell using an initial BWP. In some examples, the WTRU may be configured with a set of BWPs to continue the procedure or operation. In certain representative embodiments, at any given moment, a WTRU may have one (1) active BWP. In an example, each BWP may be configured with a set of CORESETs within which the WTRU may blind decode one or more Physical Downlink Control Channel (PDCCH) candidates for scheduling, and/or other processes or procedures.

In addition, NR may support variable transmission duration and feedback timing. In some embodiments, with variable transmission duration, for example, a Physical Downlink Shared Channel (PDSCH) or Physical Uplink Shared Channel (PUSCH) transmission may occupy a contiguous subset of symbols of a slot. In some other embodiments, with variable feedback timing, the downlink control information (DCI) for a downlink assignment may include an indication for the timing of feedback for the WTRU. In an example, the indication may indicate or point to a specific Physical Uplink Control Channel (PUCCH) resource.

In some examples, NR may support two types of PUCCH resources, a short PUCCH and a long PUCCH. The former (a short PUCCH) may be transmitted using 1 or 2 OFDM symbols, while the latter (a long PUCCH) may use, for example, up to 14 OFDM symbols. Each PUCCH type may have multiple formats which may depend on the type and/or size of the corresponding payload.

In some embodiments, NR may support dynamic HARQ-ACK codebook where the size of the HARQ codebook may depend on the number of scheduled transport blocks (TBs). A base station (e.g., a gNB) may use a counter downlink assignment index (DAI) and/or a total DAI in the DCI to indicate the number of previously scheduled TBs. In some examples, the counter DAI and/or total DAI may have a size of 2 bits, allowing a WTRU to recover up to 4 missing or missed TBs. For example, in LTE and/or NR, a counter DAI is 2 bits (included in a DCI scheduling a TB) to indicate the position of A/N bit of the TB, within the HARQ-ACK codebook.

WTRU Operations in Unlicensed Band(s)

NR may support operation(s) in one or more unlicensed bands in 3GPP Release 16, per a study item description for NR unlicensed. In an example, an NR-based operation in unlicensed spectrum may include initial access, Scheduling/HARQ, and mobility, along with coexistence methods with LTE-LAA and other incumbent RATs. Some scenarios may include an NR-based LAA cell connected with an LTE or NR anchor cell, as well as NR-based cell operating standalone in unlicensed spectrum.

In some examples of NR-unlicensed band(s), all transmissions may be preceded by a channel acquisition method (e.g., LBT). Successful LBT may be needed before a WTRU can transmit control information to the gNB. Such restriction may not be applied in LTE-unlicensed band(s), because in LTE-unlicensed spectrum, uplink control transmission may not be supported in unlicensed band. In LTE-unlicensed, Uplink Control Information (UCI) messages may be sent in licensed band(s).

Figure 2:
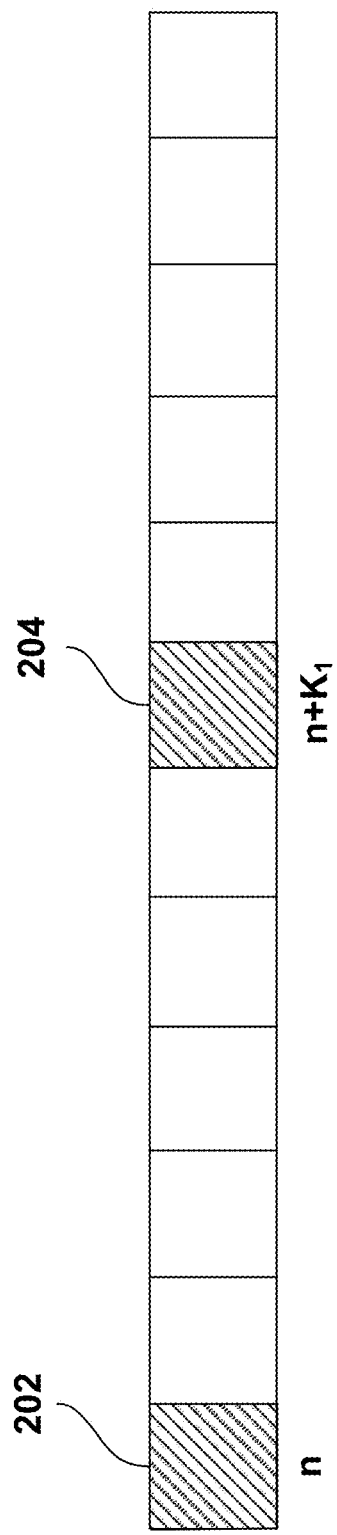
FIG. 2 is a diagram illustrating a series of subframes in an example of a HARQ feedback without clear channel assessment (CCA) according to one or more embodiments.

Referring to FIG. 2, in some examples, a HARQ protocol design in NR and/or LTE may not consider the clear channel assessment (CCA). In an example, if the gNB does not receive HARQ-ACK feedback in the configured time for feedback, the gNB may assume that a TB (e.g., scheduled in a DCI) was not received by the WTRU, or that an ACK-to-DTX/NACK-to-DTX error occurred. In some cases, configuring a $K_1$ value (e.g., HARQ feedback timing limit) may not be suitable (e.g., for NR-unlicensed operation(s)) since it is not guaranteed that a WTRU can access the channel at a configured time. For example, referring to FIG. 2, assume that DCI is received at a subframe 202 (subframe n) indicating HARQ feedback timing of $K_1$. Let us also assume that the channel is busy such that the WTRU cannot use the channel to return HARQ by subframe 204 (subframe n+$K_1$). In this case, the gNB may assume that the WTRU did not receive the TB or an error occurred.

Furthermore, NR uses dynamic HARQ feedback (e.g., a HARQ-ACK codebook) whereby acknowledgement of multiple TBs can be combined in one UCI transmission. In some examples, dynamic HARQ feedback may be transmitted rely on the time on which a TB was scheduled and/or on the time when the HARQ-ACK feedback is configured to be sent. In order for the gNB to properly interpret a HARQ-ACK codebook, both the WTRU and the gNB need to be synchronized on the size of HARQ-ACK codebook (e.g., a number of bits) and the order of each HARQ ACK/NACK bit within the codebook. A NR WTRU uses DAI to calculate the number of missed DCIs. The DAI is 2-bits in NR Release 15, and allows detection of up to 4 missed PDSCHs. If more than 4 PDSCHs were missed, then a WTRU may not be able to report the correct HARQ-ACK codebook size. In NR-unlicensed, it is expected to have collisions from other cells and other RATs and thus, missing more than 4 PDSCHs is a possibility.

Representative Procedure for Shared COT for HARQ Feedback Transmission

In some examples, COT may be shared and/or used between a network (e.g., a gNB) and a WTRU. The network (e.g., the gNB) may reserve an uplink control channel or uplink shared channel carrying UCI for a WTRU. A WTRU may then be configured to not perform LBT or configured to perform short LBT, e.g., before transmitting HARQ-ACK feedback, based on one or more of the following conditions.

In one embodiment, an RNTI is used to scramble the PDCCH scheduling TB. In an example, a WTRU may be configured with a RNTI specific for an URLLC service. Upon receiving one or more TBs scheduled by an URLLC RNTI, a WTRU may transmit HARQ feedback without performing LBT or performing short LBT. In another embodiment, a DCI format may be used to schedule a TB. For example, a WTRU may be configured with compact DCI. Upon receiving a scheduling using such DCI, a WTRU may transmit HARQ ACK/NACK without performing LBT.

In various embodiments, a WTRU may be configured to not perform LBT or configured to perform short LBT (e.g., before transmitting HARQ feedback) based on one or more of the following conditions or indications: 1) an aggregation level of DCI scheduling TB(s), 2) a search space on which DCI scheduling TB was detected, 3) CORESET on which DCI scheduling TB was detected, 4) a PUCCH resource indication. For example, a WTRU may be configured with a set of PUCCH resources which may be used without performing LBT. The configuration of such resources may be semi-statically configured or dynamically indicated. 5) A HARQ feedback codebook size. For example, a WTRU may be configured to not perform LBT if the size of HARQ-ACK codebook is below a threshold. 6) HARQ feedback timing. In some examples, an implicit indication from a gNB may be used. In an example, timing indication of PDSCH/PUSCH may be used. For example, if the HARQ feedback timing is less than $K_{1\_thr}$, LBT is not performed, where $K_{1\_thr}$ is a predefined threshold for $K_1$. In another example, if a WTRU is configured with a HARQ feedback timing above the threshold (e.g., $K_{1\_thr}$), the WTRU may perform LBT (e.g., full LBT) prior to a HARQ ACK and/or HARQ NACK transmission. 7) An HARQ process identifier (ID). In an example, a HARQ process may be considered as a TB (e.g., stored in a buffer at the WTRU) not yet delivered to an upper layer (e.g., MAC layer). A WTRU may maintain one or more HARQ processes, each may be identified by a respective HARQ process ID. A HARQ feedback (e.g., a HARQ ACK/NACK feedback) for a HARQ process may be used to indicate the current decoding state of a TB (e.g., the TB not yet delivered to an upper layer) associated with the HARQ process. For example, a WTRU may be configured with a set of HARQ process IDs that can be transmitted without performing LBT. 8) A slot format indication. In an example, based on the semi-static configuration or dynamic configuration using group common DCI, a WTRU may not perform LBT prior to HARQ feedback transmission. In some cases, a WTRU may not perform LBT in self-contained slots. And 9) an explicit bit indication in the DCI.

Figure 3A:
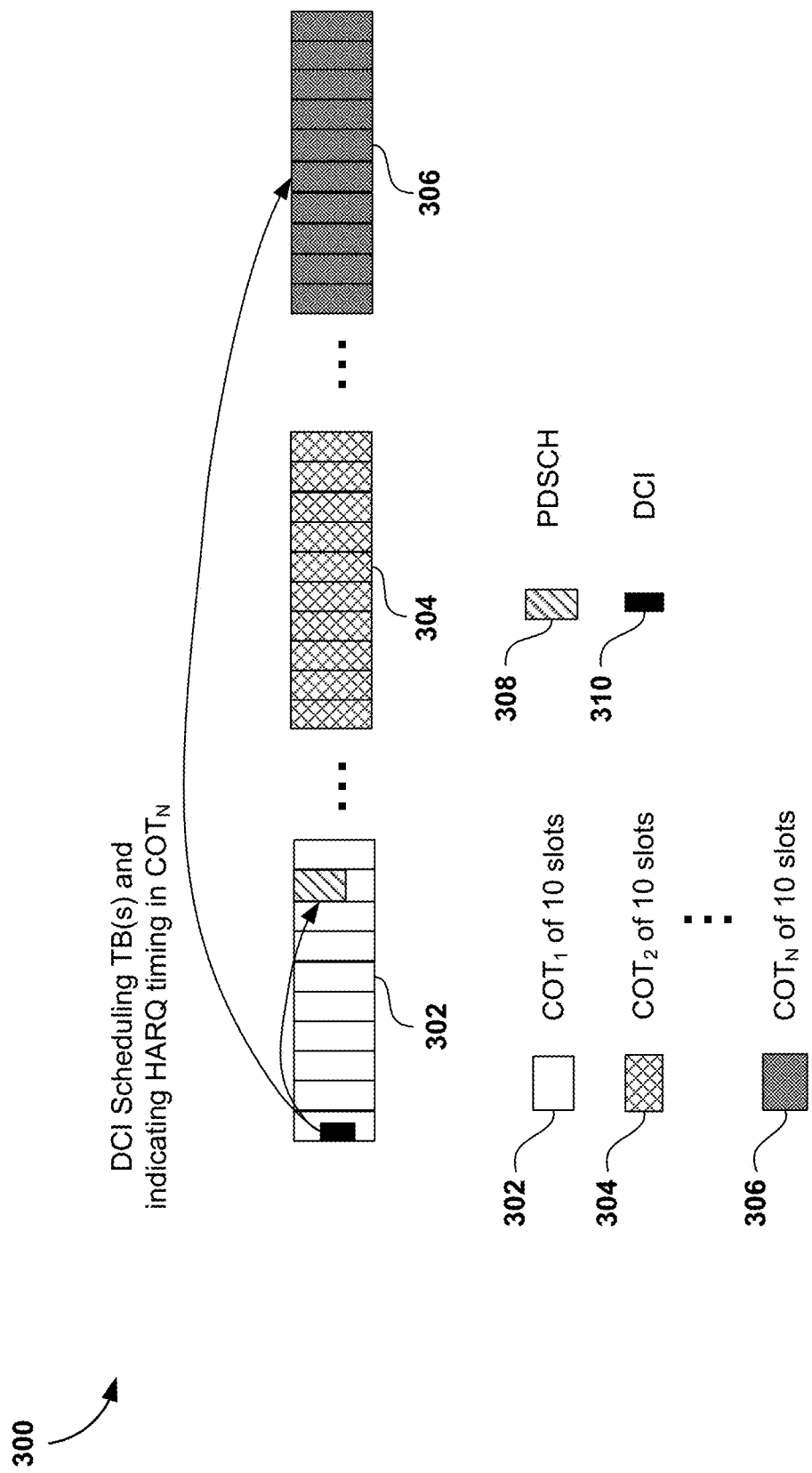
FIG. 3A is a diagram illustrating an example of HARQ transmissions in different channel occupancy times (COTs), according to one or more embodiments.

In some examples, HARQ-ACK transmission(s) may be in separate or different COTs. In an aspect, a WTRU may be configured to transmit the HARQ-ACK feedback of a transport block (TB) in the following shared COT between a gNB and the WTRU. A WTRU may be configured to determine that the HARQ ACK/NACK feedback may be or is going to be transmitted on one or more next COTs. Referring to FIG. 3A, for example, a WTRU may determine that the HARQ-ACK feedback of a TB received in a first COT ($COT_1$) may be transmitted in one or more of next COTs (e.g., $COT_2$ and/or $COT_N$ as shown in FIG. 3A), based on one or more of the following embodiments or examples.

Still referring to FIG. 3A, for a HARQ transmission mechanism 300, a WTRU may determine that the HARQ-ACK feedback of a TB received in the first COT (e.g., $COT_1$ including 10 slots each represented as a slot 302) may be transmitted in one or more of the next or ongoing COTs (e.g., $COT_2$ including 10 slots each represented as a slot 304, and/or $COT_N$ including 10 slots each represented as a slot 306), based on a dedicated bit-field in the DCI indicating a COT number, a COT index, and/or a COT offset on which the HARQ-ACK feedback is transmitted. For example, a WTRU may receive a COT offset indication in the COT (e.g., $COT_1$) on which DCI 310 was received. In an example shown in FIG. 3A, a WTRU receives DCI 310 in $COT_1$ (e.g., to schedule one or more TBs) and the DCI 310 indicates a HARQ feedback timing in a later COT such as $COT_N$ (e.g., in a slot 306). In some examples, a WTRU may be configured using higher layer signaling (e.g., RRC signaling) with a set of "COT offset(s)" (e.g., in a table or list) and DCI bit-field points to some of the configured values (e.g., a position in the table or list). In another embodiment, the WTRU may autonomously keep track of the COT indices, such as, by counting the number of occurrences of a particular signal found only once per COT (e.g., a COT preamble). In another example, the COT index may be determined by reception of a signal from the gNB explicitly indicating the COT index of an ongoing COT. For example, the UE may expect a transmission (e.g., on a group common channel) at some point within a COT providing the index of the COT.

In some embodiments, a WTRU may determine that the HARQ-ACK feedback of a TB received in the first COT ($COT_1$) may be transmitted in one or more of the next COTs, based on the DCI and/or reusing a PDSCH-to-HARQ timing indicator in the DCI. Referring to FIG. 3B, a Table 320 and a Table 330 include one or more of: different codepoints, PDSCH-to-HARQ timing indicators (values of $K_1$, $K_2$, $K_3$, and $K_4$), and units (e.g., slots, COT(s), or COT(s) and slots). In an example, as shown in Table 320 of FIG. 3B, a subset of a PDSCH-to-HARQ timing indicator may be configured in units of slots, and another subset of the PDSCH-to-HARQ timing indicator may be configured in units of "gNB initiated COT." In another example, as shown in Table 330 of FIG. 3B, a set of PDSCH-to-HARQ timing (e.g., in a PDSCH-to-HARQ timing indicator) may indicate COT offset(s) and the slots within the COT.

In some embodiments, a WTRU may determine that the HARQ-ACK feedback of a TB received in the first COT ($COT_1$) may be transmitted in one or more of the next COTs based on any of a PDSCH-Time Domain Resource Allocation and the PDSCH-to-HARQ timing indicator in the DCI that is/are being reused. For example, upon receiving a PDSCH time domain allocation in the last one or more slots (e.g., the last X slots) of a COT and the PDSCH-to-HARQ timing indicating a value greater than $K_{1\_thr}$, the WTRU may determine that the HARQ feedback (e.g., HARQ ACK/NACK feedback) is to be transmitted in the next gNB-initiated COT. In an example, a WTRU may apply PDSCH-to-HARQ timing from the starting slot of the next, or future, COT. For example, a WTRU may receive a PDSCH-to-HARQ timing value of 4 slots. A WTRU may transmit the HARQ feedback 4 slots after the start of the next COT. In another example, a WTRU may be configured to transmit the HARQ feedback in the next COT in a slot having a slot number being equal to the sum of $K_0$ value in the PDSCH-time domain resource allocation and the PDSCH-to-HARQ timing-indicator. In some cases, the values of X and $K_{1\_thr}$ may be configured using higher layer signaling (e.g., SIB/RRC specific signaling) or fixed in a standard. In an example, the WTRU may receive a PDSCH-to-HARQ timing value that indicates a COT index (e.g., an index that includes one or more offsets from the COT used for the PDSCH) and one or more slots within the COT for the HARQ feedback transmission.

In some embodiments, a WTRU may determine that the HARQ-ACK feedback of a TB received in the first COT ($COT_1$) may be transmitted in one or more of the next COTs based on at least a search space and/or CORESET used for DCI transmission. For example, a WTRU may be configured with a set of search spaces and/or CORESETs for which HARQ feedback related to TBs scheduled by those search space sets and/or CORESETs may be sent in the next COT(s). A WTRU may be configured to transmit the HARQ feedback on the slot number indicated by the PDSCH-to-HARQ timing indicator within the next COT, or on a slot number equal to the sum of $K_0$ value in the PDSCH-time domain resource allocation and the PDSCH-to-HARQ timing indicator within the next COT.

In an example, a COT may be configured by the network (e.g., a gNB) with a fixed duration (as shown in FIG. 3A, where the COT has a duration of 10 slots) for a WTRU. In another example, the COT duration may change from one channel occupancy to another channel occupancy. In some examples, a WTRU may be configured to determine the duration of a COT or each COT based on one or more of the following factors.

In some embodiments, a WTRU may be configured to determine the duration of one or each COT based on a slot format indication. For example, a WTRU may be configured to receive a slot format indication at the beginning of each COT. Based on the slot format indicated in the slot format indication, the WTRU may determine the number of slot(s) and/or symbols allocated for DL, flexible and UL, and then determine the current COT duration. Furthermore, a WTRU may be configured with a mapping rule or index between the slot formats and the COT durations.

In some embodiments, a WTRU may be configured to determine the duration of one or each COT based on the search space periodicity configuration. For example, a WTRU may be configured to determine the COT duration based on the search space periodicity and/or duration configuration. In one implementation, the WTRU may determine the COT duration based on the maximum periodicity and/or duration of the configured search space sets.

In some embodiments, a WTRU may be configured to determine the duration of one or each COT based on one or more preamble transmissions. For example, a WTRU may be configured to monitor a set of preambles with different sequences and/or lengths. Upon detecting a preamble with a specific sequence or length, the WTRU may determine the duration of a gNB-initiated COT. In some cases, a WTRU may be configured with a mapping rule or index between the COT duration and the preamble.

Representative Procedure for Combining HARQ-ACK Feedback of Multiple TBs

In some examples, for HARQ-ACK codebook determination, a WTRU may be configured to transmit ACK/NACK (A/N) feedback for all received TBs prior to the feedback transmission time in one HARQ-ACK codebook. A WTRU may transmit additional information along with the HARQ-ACK codebook to indicate HARQ process ID(s) and/or the number of HARQ process IDs carried by the codebook. In some cases, the number of HARQ process IDs may be equal to the number of TBs acknowledged (or the number of received TBs). In some embodiments, the additional information may include any of the following: 1) received time of the first TB acknowledged in the codebook. For example, slot number and/or subframe number of the first NN in the codebook; 2) received time of the last TB acknowledged in the codebook; 3) number of TBs acknowledged in the HARQ feedback; and 4) an indication of the HARQ process ID transmitted in HARQ-ACKs feedback. For example, a WTRU may be configured with a set of HARQ process IDs that can be transmitted within a HARQ-ACK codebook. In an example, 8 out of 16 HARQ process IDs can be transmitted in one codebook while the remaining 8 HARQ process IDs can be transmitted in a different HARQ codebook. In some cases, a HARQ process ID identifies a HARQ process. Alternatively, a WTRU may transmit a bitmap indicating the subset of HARQ process IDs transmitted in the feedback.

In some embodiments, a WTRU may be configured to exclude the A/N feedback of TBs received in a preconfigured time window prior to HARQ codebook transmission. For example, a WTRU may not be able to process TBs received in the last subframe preceding HARQ feedback transmission and thus does not transmit the A/N of the last TB.

Figure 4:
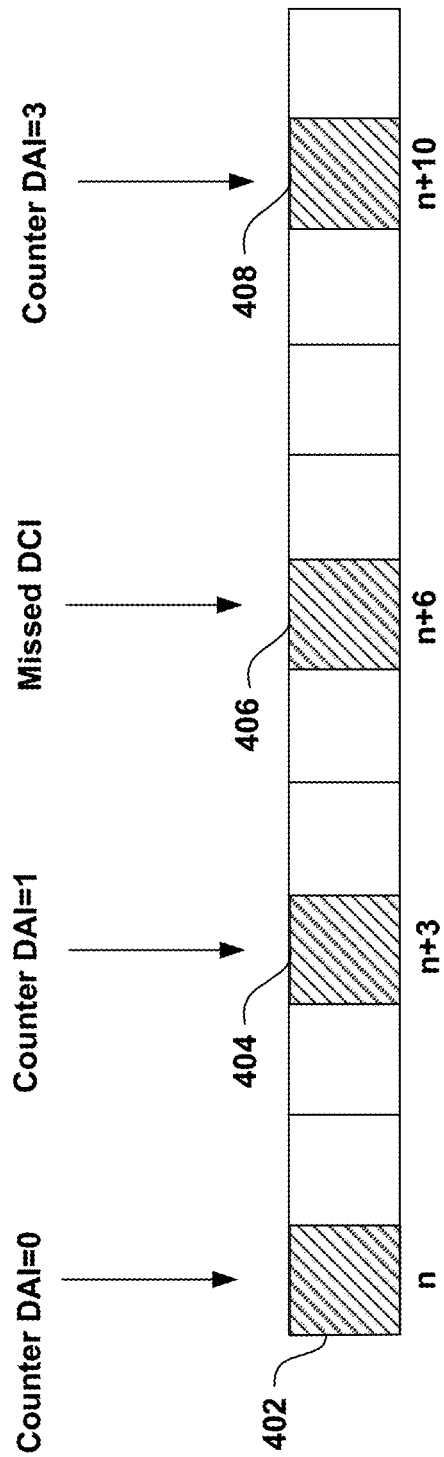
FIG. 4 is a diagram illustrating a series of subframes in an example of HARQ feedback with a counter downlink assignment index (DAI), according to one or more embodiments.

In some embodiments, a WTRU may be configured with counter DAI and/or total DAI to determine the number of scheduled TBs and the sequence of A/N bits within the HARQ-ACK codebook. The WTRU may, upon detecting a missing DCI, transmit the HARQ-ACK codebook with only TBs received prior to the misdetection time. For example, as shown in FIG. 4, a WTRU received two DCIs scheduling a first TB in a subframe 402 (e.g., subframe n) and a second TB in a subframe 404 (e.g., subframe n+3) with counter DAI c=0 and c=1, respectively. The WTRU then receives a DCI scheduling TB with counter DAI c=3 in a subframe 408 (e.g., subframe n+10). The WTRU determines that at least one DCI is missing and then reports HARQ-ACK feedback for only the TB in subframe 402 and the TB in subframe 404 ($TB_1$ and $TB_2$). In an example, the missed DCI is scheduling a TB in a subframe 406 (e.g., subframe n+6).

For HARQ ACK codebook accumulation, in some examples, a WTRU may be unable to acquire the channel to transmit HARQ-ACK feedback for one or a set of TBs. In this case, the WTRU may transmit the HARQ-ACK feedback for that codebook in a future HARQ-ACK feedback resource. Between the time of the failed HARQ-ACK feedback resource and the future resource, the WTRU may be scheduled for more PDSCH transmissions. The WTRU may combine the HARQ-ACK bits for the previously non-fed back TBs with the HARQ ACK bits for new TBs in a new codebook. In an example, the two sets of bits may be handled as two separate codebooks (e.g. encoded separately) in the same feedback report. In another example, the two sets of bits may be considered as a single, larger codebook. The WTRU may provide an indication in the feedback report of the total number of codebooks included in the report (or the total number of TB sets included in the report, or the number of combined HARQ-ACK feedback report sets included in the report).

In some examples, the WTRU may be provided with periodic HARQ-ACK feedback resources. The WTRU may use the periodic HARQ-ACK feedback resources to transmit a set of feedback bits for a set of TBs for which the WTRU has not yet transmitted feedback. The codebook size may increase with every failed channel access for feedback reporting. The WTRU may use such periodic HARQ-ACK resources as fallback if it was unable to transmit HARQ-ACK in dynamically indicated HARQ-ACK feedback resources.

The accumulation may be done for feedback of TBs transmitted in different unlicensed channels (where an unlicensed channel is defined as a portion of an unlicensed carrier that can be acquired with an LBT process). For example, a WTRU may receive multiple TBs in a first unlicensed channel and may be expected to feedback HARQ-ACK in the same channel. However, the WTRU may be unable to acquire the channel for HARQ-ACK feedback. The WTRU may then be scheduled in a second unlicensed channel and may report feedback in that second channel. The feedback report in the second unlicensed channel may include the accumulated feedback for both the first and second set of TBs (received by the WTRU in the first and second unlicensed channel, respectively).

In some embodiments, a WTRU may be configured with a time period ti in which A/N feedback of a TB should be sent to the network. The time period ti may be defined as an offset from the time a TB was received or an offset from the time DCI scheduling a TB was received. Such time period may be configured semi-statically or dynamically.

Alternatively, a WTRU may be configured with a set of times $\{k_{1,1}, k_{1,2}, \ldots k_{1,N}\}$ for possible HARQ-ACK transmission. For example, a WTRU receives a DCI scheduling a TB in subframe n, and HARQ-ACK feedback of that TB can be transmitted in any of subframes $n+k_{1,1}$, $n+k_{1,2}, \ldots n+k_{1,N}$ depending on LBT outcome. The set of times may be configured semi-statically or dynamically.

In another embodiment, a WTRU may be configured with timing for HARQ-ACK transmission and a timer. For instance, a WTRU may start the timer upon failing to transmit HARQ-ACK feedback in the configured time. Upon timer expiry, the WTRU attempts to retransmit the HARQ-ACK feedback. The values for the time to transmit HARQ-ACK feedback and the timer may be configured using higher layer signaling or may be dynamically indicated. While the timer is running, a WTRU may receive a timing update from the network. In another embodiment with a timer, the WTRU may attempt to send HARQ-ACK while the configured timer is running. Upon timer expiry, the WTRU may monitor the PDCCH for a retransmission or a HARQ-ACK trigger signal from the gNB prior to sending HARQ-ACK. The WTRU may further adjust or add value to the timer. For example, the WTRU may extend the timer upon determining that the channel was busy or occupied by the serving cell.

In some examples, trigger(s) may be used for transmitting a HARQ-ACK codebook. A WTRU may be configured to transmit HARQ-ACK feedback in response to (e.g., receiving or identifying) one or more of the triggers. The one or more triggers may include the number of received PDSCHs being above a threshold. For example, a WTRU may be configured to transmit HARQ-ACK feedback for all received PDSCHs after receiving N PDSCHs. The one or more triggers may include a determination that N slots and/or $K_N$ symbols and up to N' slots and/or $K'_{N'}$ symbols have been transmitted or received. The one or more triggers may include the number of switching point(s) from downlink to uplink. For example, a WTRU may be configured to transmit HARQ-ACKs after M=1 switching point, e.g., each time there is a switch from downlink to uplink). In some cases, the one or more triggers may include a determination that downlink control signaling indicating a set of HARQ process(es) has been received. The one or more triggers may include a determination that a failure to transmit HARQ-ACK codebook in a previous HARQ-ACK resource occurs. For example, the failure to transmit HARQ-ACK codebook may be that the WTRU was unable to acquire a channel in a previous HARQ-ACK resource. In another example, the WTRU may accumulate more than a threshold number of feedback bits in a previous HARQ-ACK resource (e.g., due to one or more previously failed channel accesses for feedback reporting), and the WTRU therefore segmented the feedback report into multiple reports, each to be transmitted in different HARQ-ACK resources, since the WTRU cannot transmit the HARQ-ACK codebook in one HARQ-ACK resource.

In various embodiments, a WTRU may store or maintain feedback values for a HARQ process. For example, the WTRU may further store or maintain feedback values for a HARQ process after receiving a New Data Instance (NDI) for the concerned HARQ process. The WTRU may then provide aggregate feedback for a number of TBs already transmitted on the same HARQ process ID, possibly upon receiving a trigger to transmit HARQ-ACK(s) from the network.

Representative Procedure for Retransmission of HARQ-ACK Information

In some embodiments, a WTRU may transmit HARQ-ACK information that was originally scheduled to be included in a first resource (PUCCH or PUSCH) and in a first-time instance, in a second resource (PUCCH or PUSCH) and in a second-time instance. Such solutions may be useful where transmission on the first resource and time instance could not take place due to LBT failure. More generally, the solutions may also be useful whenever the network detects that HARQ-ACK information was not successfully received for a specific instance.

To support retransmission of HARQ-ACK information, the WTRU may associate a codebook process (or codebook process identity) with a set of HARQ-ACK feedback bits corresponding to a set of downlink transmissions. In an example, a codebook process may be a set of HARQ-ACK feedback for one or more HARQ processes, and each HARQ-ACK feedback is associated with at least one bit per TB. The WTRU may keep the set of HARQ-ACK bits of a codebook process in memory until it generates a new set of HARQ-ACK bits for the same codebook process, possibly for a different set of downlink transmissions. The WTRU may be scheduled to include HARQ-ACK bits of at least one codebook process in a resource. Solutions to enable the above steps are described in the following. The number of codebook processes may be predetermined or configured by higher layers.

Some examples are provided herein for determination of codebook process for HARQ-ACK of a DL transmission. When generating HARQ-ACK for a DL transmission, for example, the WTRU may obtain the corresponding codebook process based on at least one of the following solutions.

In an example, the codebook process may be explicitly identified in the DCI scheduling the DL transmission using a new or existing field. For example, each codepoint of a PUCCH resource indicator field or of a PDSCH-to-HARQ feedback timing indicator field may be associated with a specific process index, in addition to other information as per the existing interpretation of the field.

In various embodiments, the codebook process may be implicitly identified by any of the following properties of the DL transmission: 1) timing of the DL transmission, e.g., in terms of subframe number, slot number or symbol index when the transmission starts or stops; 2) a bandwidth part (BWP) index; 3) a carrier or serving cell index; and 4) timing of the UL transmission (or resource) in which HARQ-ACK is to be included, possibly based on information included in DCI of the DL transmission. Such timing may be in terms of any of: subframe number, slot number, and/or symbol index.

In one embodiment, one or more codebook processes may be identified by a transmission profile, or a set or parameters, associated with a DL transmission. Each DL transmission may be associated with or parameterized by a transmission profile. A transmission profile may be determined by, or may indicate, any of: a priority requirement, a latency requirement, a block error rate (BLER) requirement, a transmission power requirement, a redundancy requirement, a repetition requirement, and an LBT category requirement. In an example, the WTRU may maintain multiple different codebook processes, and each codebook process may be associated with a respective transmission profile (e.g., associated with a service type such as eMBB or URLLC). In some cases, different variants may be used for URLLC, each with a different transmission profile (and a different corresponding codebook process). In another embodiment, one or more codebook processes may be identified by a parameter of the DL transmission, such as a priority of the DL transmission. For example, the WTRU may determine a priority based on a parameter of the DL transmission. In another example, the priority may be determined based on a priority indication in the DCI that schedules the DL transmission.

The codebook process may be implicitly identified based on the UL resource and/or time instance in which HARQ-ACK is to be included. For example, the WTRU may maintain a current codebook process index and cycle the process index (e.g., increment, with modulo, the number of codebook processes) when a new time instance and/or resource is indicated for the transmission of HARQ-ACK. Possibly, the current process index is incremented only if a field in the DCI indicating the new time instance and/or resource is set to a specific value. For example, a new field "HARQ-ACK retransmission" may be included in the DCI, and the WTRU would increment the codebook process only if such field is set to zero.

In one embodiment, the codebook process index may be determined as a function of the indicated PUCCH resource index. In another embodiment, the codebook process index may be determined as a function of the transmission profile and/or the priority associated with a respective DL transmission. For example, different sets of codebook process indices may be reserved for transmissions of different priorities. When a WTRU is scheduled with DL transmissions of a specific priority and determines a new codebook process index is required, the WTRU may use the lowest (or the highest) available index value for transmission(s) having the specific priority. In another example, the WTRU may shift all codebook process index values of existing codebook processes upon being required to construct a new codebook process for data having a higher priority.

In some examples, codebook process(es) of HARQ-ACK transmitted on a resource may be identified or determined. When transmitting HARQ-ACK information over a PUCCH or PUSCH resource, the WTRU may include HARQ-ACK of at least one codebook processes per at least one of the following solutions.

In an example, a set of codebook processes may be explicitly indicated in DCI indicating the resource. For example, a field in a DCI indicating a PUCCH resource may indicate the index of a codebook process for which HARQ-ACK information is to be included. Such field may correspond to an existing field, such as the PUCCH resource indicator, or a newly defined field.

Such indication may be an absolute index or may be relative to the current process index. For example, a value of zero (0) may correspond to the current process index, a value of one (1) may correspond to the previous process index (C−1) modulo the number of processes, and so on. In another example, each codepoint of a field may indicate a subset of codebook processes based on a pre-defined mapping or based on higher layer signaling. For example, if two codebook processes are configured, a first codepoint may correspond to the current process index, a second codepoint may correspond to both processes, a third codepoint may correspond to the previous process index and a fourth codepoint may correspond to no process. In the latter case, no HARQ-ACK information may be included and a PUCCH transmission may not be performed.

In another example, a field in a DCI may indicate the number of processes, N, for which HARQ-ACK information is to be included. In this case, the set of processes may correspond to $\{C-N+1, C-N+2, \ldots, C\}$ (modulo the number of processes) where C is a current process index.

In an example, a codebook process may be implicitly indicated in the DCI indicating the resource. For example, if the DCI corresponds to a DL assignment, the codebook process for the corresponding HARQ-ACK (as determined for example using a solution described in the above paragraphs) may implicitly be indicated by the particular resource(s) assigned for HARQ-ACK feedback. In some cases, the HARQ-ACK bits to be included in the resource may include one or more HARQ-ACK bits for the DL assignment indicated by the DCI. In this case, there may be no need to indicate the codebook process(es) explicitly using another field of the DCI.

In case the PUCCH resource is indicated by more than one DCI, the codebook process(es) to be included may correspond to the latest received DCI.

In one embodiment, the set of codebook processes may be dependent on a DCI format. For example, a new DCI format may be defined which contains an indication of PUCCH resource without a DL assignment. When this DCI format is received, the WTRU may include HARQ-ACK of a set of codebook processes explicitly indicated in such format. In case a DCI format indicates that a DL transmission has been received, the WTRU may include HARQ-ACK information of the codebook process corresponding to the DL transmission.

In one embodiment, the WTRU may include at least one codebook process index in a PUCCH or PUSCH resource to indicate the set of codebook processes for which HARQ-ACK is included in the resource. This solution may be used, for example, when there is no DCI dynamically scheduling the resource.

In some embodiments, a WTRU may be configured to adjust the codebook process bits based on a one-shot HARQ feedback request received from the network (e.g., a gNB).

One-shot HARQ feedback may be defined as a WTRU transmitting all ACK/NACK bits (or a set/group of ACK/NACK bits) upon receiving a request from the network. The WTRU may be configured to simultaneously support the codebook process feature as well as one-shot HARQ feedback feature. The WTRU then groups multiple HARQ feedbacks on codebook processes in addition to monitoring one-shot HARQ feedback request(s). In an example, a WTRU may be configured to flush all the codebook processes after transmitting a one-shot HARQ feedback. In another example, a WTRU may be configured to remove the ACK/NACK bits of the codebook processes corresponding to TBs received X ms (or more) prior to transmitting the one-shot HARQ feedback. In an example, a WTRU may be configured (e.g., based on an indication from the network) to remove, e.g. only remove, the ACK/NACK(s) of the TBs which were part of the one-shot HARQ feedback (e.g., the one-shot HARQ feedback transmitted after a successful LBT) from the codebook processes. Alternatively, a WTRU may be configured to keep the ACK/NACK bits of the codebook processes regardless of whether the one-shot HARQ feedback was transmitted or not.

Representative Procedure for HARQ-ACK Resource Determination

Figure 5:
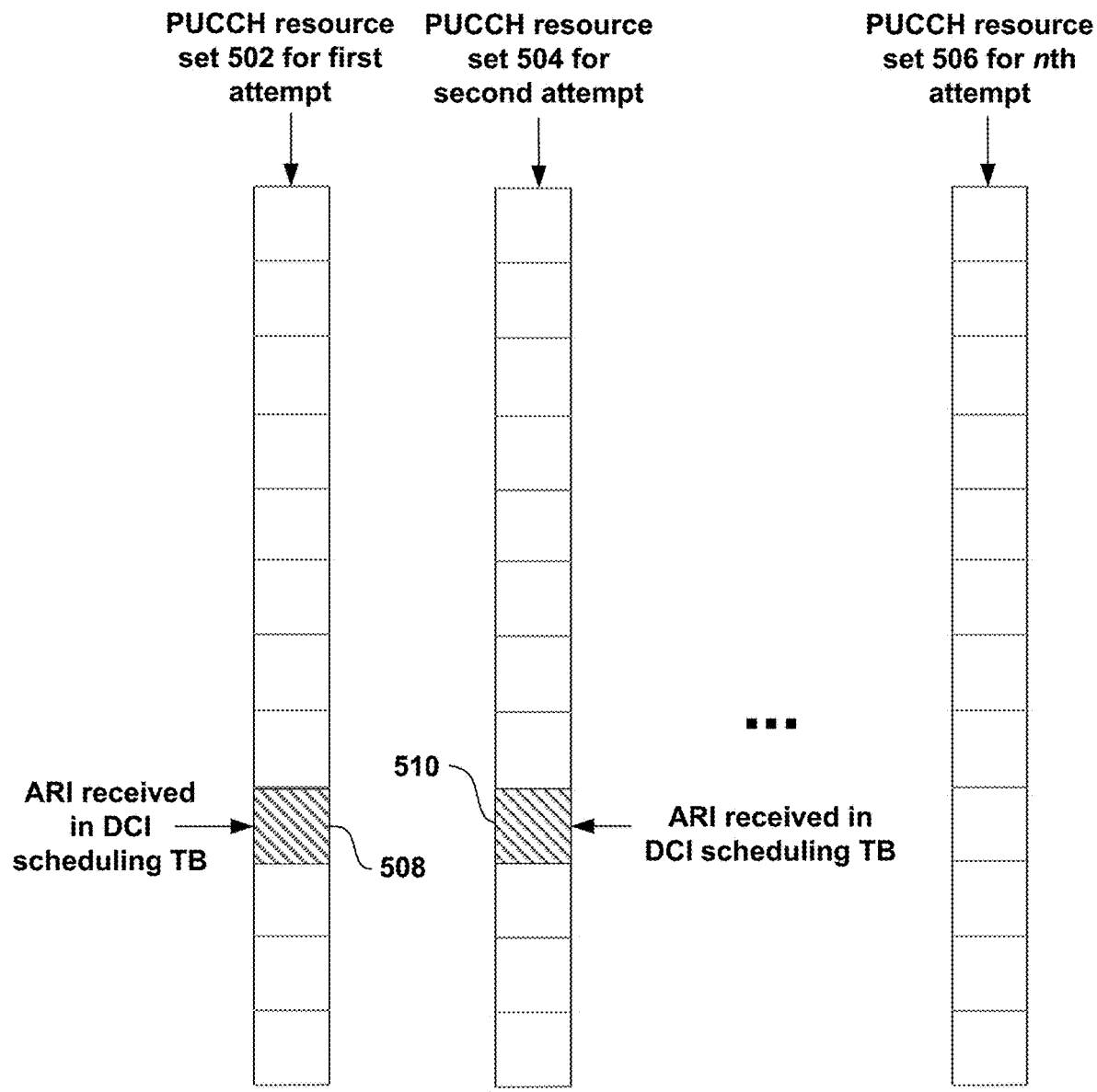
FIG. 5 is a diagram illustrating an example of using multiple Physical Uplink Control Channel (PUCCH) resources for HARQ transmissions, according to one or more embodiments.
Figure 6:
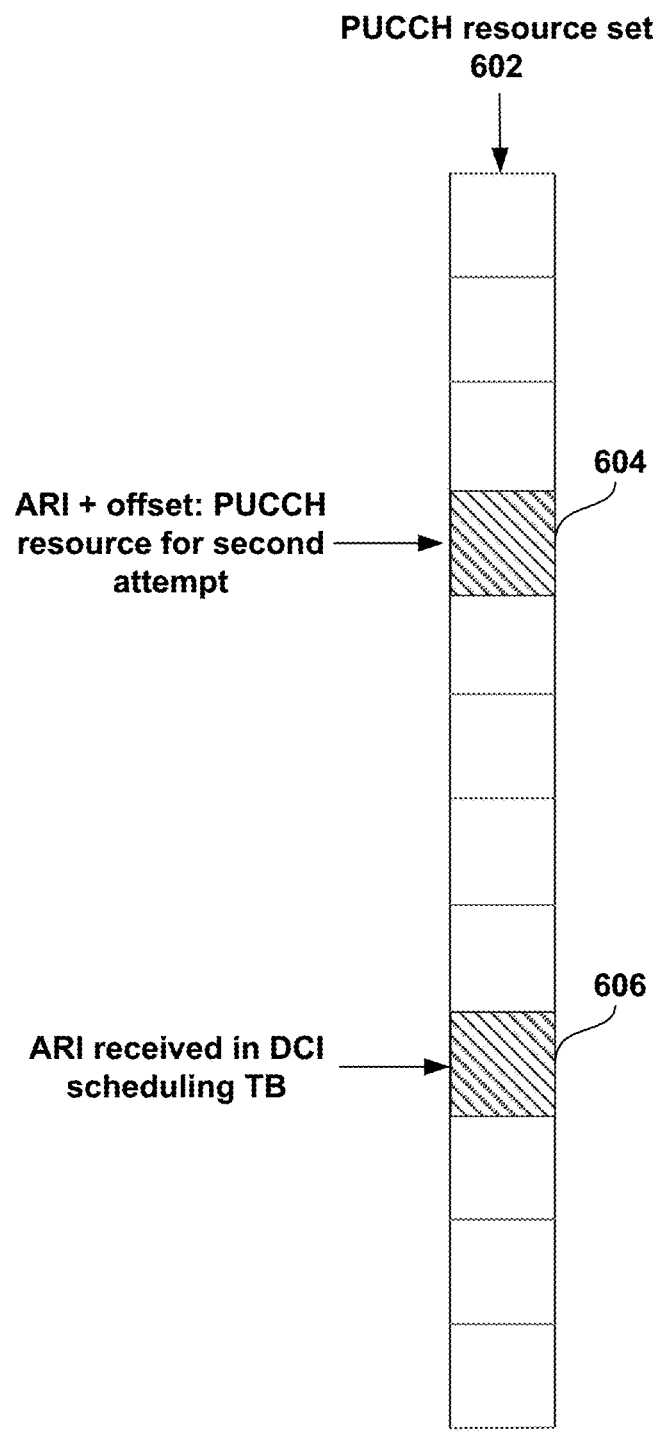
FIG. 6 is a diagram illustrating an example of configuring an offset with an Acknowledgement Resource Indicator (ARI) when selecting from a PUCCH resource set according to one or more embodiments.

Referring to FIG. 5 and FIG. 6, in some examples, multiple HARQ-ACK feedback resources may be used or configured. To handle reduced HARQ NN transmission opportunities, a WTRU may be provided with multiple PUCCH resources for HARQ-ACK transmission. A WTRU may be configured to select one PUCCH resource from the multiple PUCCH resources based on one or more of the following.

A first example is outcome of LBT. For instance, a WTRU may determine the PUCCH resource based on success or failure of LBT. Referring to FIG. 5, in an example, the WTRU may be configured with multiple PUCCH resource sets (e.g., PUCCH resource set 502, PUCCH resource set 504, and PUCCH resource set 506), wherein each resource set is applicable to the $n^{th}$ channel access attempt. For example, when first attempting to transmit the HARQ feedback, the WTRU selects a first PUCCH resource set 502 and, based on the Acknowledgement Resource Indicator (ARI) in DCI 508, the WTRU determines the resource within the resource set 502. In some cases, if the WTRU fails to access the channel in the selected resource, the WTRU may select the resource, based on the ARI (e.g., in DCI 510), from a second PUCCH resource set 504. In another example illustrated in FIG. 6, the WTRU may be configured with an offset (e.g., in DCI 604) to be added to ARI (e.g., received in DCI 606 and/or DCI 604) when selecting from a PUCCH resource set 602. The offset and/or PUCCH resource set configuration for LBT failure can be semi-statically configured or dynamically indicated. For example, a WTRU, after failing to transmit HARQ feedback (e.g., based on the ARI in DCI 606), may receive an offset indication in a DCI (e.g., DCI 604) or a resource set indication.

A second example is randomization. For example, a WTRU may be configured to randomly select a resource from the PUCCH resource set. In such case, the network may not know which WTRU is transmitting the feedback. In order to resolve this issue, a WTRU may be configured to indicate to the network the identity of the WTRU along with the feedback. For example, a WTRU may attach a cyclic redundancy check (CRC) scrambled with a Cell RNTI (C-RNTI) to the HARQ-ACK codebook.

A third example is DCI misdetection. For example, a WTRU may select UCI resource based on whether DCI is missing. For example, the WTRU may be configured to transmit HARQ-ACK feedback only for TBs prior to DCI misdetection. In such case, a WTRU may use a different PUCCH resource set and/or different resource within PUCCH resource set for HARQ-ACK as compared to when it correctly detects DCI.

A fourth example is upon reception of a PUCCH trigger signal. The PUCCH trigger signal may be based on receiving PDCCH, for example. The PUCCH trigger signal may further indicate to the WTRU the availability of certain PUCCH resource(s), possibly with certain LBT requirements or no LBT.

In various embodiments, a WTRU may be configured to transmit HARQ feedback on PUSCH resources. For example, a WTRU may include a HARQ-ACK codebook from a failed PUCCH transmission in the next PUSCH opportunity. For example, a HARQ-ACK feedback may be configured to be transmitted in slot n. After performing LBT, a WTRU fails to access the uplink control channel. A WTRU may then use the next uplink grant to send the HARQ-ACK feedback. In order for the gNB to correctly decode PUSCH carrying UCI and data, a WTRU may be configured to use a PUSCH grant for HARQ-ACK transmission only after the first failed HARQ-ACK transmission and until a configured time. Such time can be configured using an offset from the first HARQ-ACK transmission occasion. Alternatively, a WTRU may be configured to use PUSCH only in the configured time for HARQ-ACK transmissions. For example, when a WTRU is configured with a set of timing $\{k_{1,1}, k_{1,2}, \ldots k_{1,N}\}$ for possible HARQ-ACK transmission, a WTRU is allowed to use PUSCH only during those same times.

Representative Procedure for HARQ Feedback for Uplink Transmission

A WTRU may monitor for one or more DL HARQ-ACK feedback, and the WTRU may be configured to monitor a physical downlink channel to receive downlink HARQ-ACK feedback for uplink transmissions. The physical downlink channel may be in a configured pre-defined time and frequency resource. Alternatively, a WTRU may be configured to monitor DCI within multiple time and frequency locations to receive downlink HARQ-ACK feedback. For example, a WTRU may be configured to monitor a large numbers of DCI candidates over multiple CORESETs/search space sets and, based on the gNB channel occupancy, a WTRU prioritizes a sub-set of CORESETs/search space sets to be monitored. In some examples, a WTRU may prioritize a CORESET/search space based on one or more of the following. In one embodiment, the WTRU may prioritize a CORESET/search space based on a CORESET/search space set ID. For example, a WTRU may be configured to prioritize search space with index "0" for downlink HARQ feedback monitoring. In another embodiment, the WTRU may prioritize a CORESET/search space based on a CORESET/search space set on which the last DCI was received. For example, a WTRU may prioritize monitoring a CORESET on which the DCI scheduled a last received TB.

In one example, a WTRU may be configured with multiple BWPs, with only one BWP of the multiple BWPs being active at any given time. A WTRU may switch its active BWP or monitor all the configured BWPs if the downlink feedback is not received within a preconfigured time. In another example, a WTRU may be configured with multiple CORESETs and may monitor only a subset of the configured CORESETs for HARQ feedback. However, if the downlink feedback is not received in that subset of CORESETs within the preconfigured time, the WTRU then monitors all the CORESETs.

A WTRU may be configured so that the WTRU receives DL HARQ-ACK using a group common PDCCH. A WTRU may be configured with a group ID to be scrambled with DCI carrying the group common PDCCH. Alternatively, a WTRU may determine the group ID based on the HARQ process ID process for which that WTRU is expecting to receive an acknowledgement. For example, a WTRU is configured with maximum HARQ processes equal to 16. The WTRU is expecting at a given slot an acknowledgement for HARQ processes 0, 4 and 10. In some cases, the WTRU then monitors a group common DCI scrambled with 1000100000100000.

Representative Procedure for UL HARQ Operation and Scheduling

In some examples, multiple PUSCH opportunities may be provided by a single scheduling DCI. The WTRU may receive multiple grants for a single HARQ process ID, possibly with disjoint PUSCH transmission durations, using a single PDCCH scheduling DCI. Upon receiving such grant, the WTRU may attempt to transmit a TB on the first granted PUSCH occasion. Upon failing LBT, the WTRU may attempt to transmit PUSCH on the next granted PUSCH occasion, and may further repeat such action until LBT succeeds and the TB is transmitted.

Upon successfully transmitting a TB on a PUSCH grant within the series of provided PUSCH grants for a single HARQ process, the WTRU may ignore the remaining PUSCH occasions within the series of provided PUSCH grants. Alternatively, for example, upon successfully transmitting a TB on a PUSCH grant within the series of provided PUSCH grants, the WTRU may attempt to transmit another TB. Such attempt may depend on a network configuration, or on receiving control signaling from the network. For instance, upon successfully transmitting a TB on a PUSCH grant within the series of provided PUSCH grants, the WTRU may attempt to transmit another TB on the next granted PUSCH occasion if it receives a New Data Indicator (NDI) or the WTRU receives an ACK for the previous TB transmitted on the same HARQ process.

In some examples, when the WTRU transmits different TBs on different PUSCH occasions using a single grant, the WTRU may determine the HARQ ID associated with each TB based on one or more of the following embodiments. In some cases, a pool or set of HARQ process IDs (PIDs) may be indicated dynamically, for example, based on one or more embodiments discussed below.

In some embodiments, the WTRU may determine the HARQ ID associated with each TB based on a selection from a pool or a set of HARQ IDs signaled by L1 signaling (e.g., part of the HARQ Information in the DCI). For example, the DCI may indicate a pool/set of HARQ PIDs that are mapped consecutively to each TTI or PUSCH duration that may be used, and the WTRU may select one or more HARQ PIDs in the order of the selected TTI for transmission. In another example, the WTRU may select a HARQ PID from the pool randomly or according to a configured pattern by higher layers (e.g., a pre-configured pattern).

In some embodiments, the WTRU may determine the HARQ ID associated with each TB based on a formula. In some cases, the WTRU may use a formula to determine the HARQ process ID or PID. For example, the HARQ process ID may be a function of at least one of: a selected PUSCH duration, an indicated HARQ process ID pool/set, the current slot or mini-slot, and/or the subframe/frame timing.

In some embodiments, the WTRU may determine the HARQ ID associated with each TB based on one or more selected TTI/PUSCH occasions. For example, the WTRU may be assigned a single HARQ process ID in the HARQ information, then the WTRU may use an increment of the indicated HARQ process ID based on the time delta between the selected PUSCH occasion and the first PUSCH occasion indicated for the grant (or similarly, based on the time delta between the selected PUSCH occasion and the TTI during which the DCI was received). In an example, if the DCI was received in slot x and the indicated HARQ process is y, the WTRU may select HARQ process y+3 when PUSCH is transmitted in slot x+3.

In some embodiments, the WTRU may further select the HARQ process ID for a new TB transmission by avoiding HARQ process ID already in use for different TBs, for example, a HARQ process ID being used for a TB for which the NDI has not been toggled, or a HARQ process ID for which an acknowledgement has not been indicated. In some cases, for any of the above mentioned HARQ process ID selection methods, the WTRU may skip over one or more (or all) HARQ process IDs that are still in use for retransmissions.

In an example, after the WTRU receives a grant intended for multi-TTI scheduling, the WTRU may attempt LBT on each possible PUSCH occasion until a transmission can be made or the channel is acquired.

In another example, after the WTRU receives a grant intended for multi-TTI scheduling, the WTRU may attempt a single LBT for a set of consecutive PUSCH durations (e.g., a set of PUSCH durations without gaps). For example, the WTRU may apply a single LBT for a set of consecutive TTIs without gaps in-between (e.g., no gaps between any two consecutive TTIs of the set of TTIs). Upon LBT being successful and the channel being acquired for a first TTI, the WTRU may transmit PUSCH in adjacent TTIs without requiring further LBT. On the other hand, upon LBT determining a channel is busy prior to a first TTI, the WTRU may perform LBT prior to the second TTI. In some cases, if the second LBT is successful, all upcoming adjacent TTIs may not require LBT. On the other hand, if the second LBT determines the channel is busy, subsequent TTIs may require LBT prior to transmission(s) on the subsequent TTIs in a similar manner.

In an example, after the WTRU receives a grant intended for multi-TTI scheduling, the WTRU may attempt single LBT for a set of consecutive TTIs, such that the transmission duration of the set is not greater than that applicable to the LBT type.

In some examples, after the WTRU receives a grant intended for multi-TTI scheduling and the indicated HARQ process is already in use for a previous TB (e.g., a HARQ PID for which NDI has not been toggled), and the grant indicates multi-TTI scheduling, the WTRU may attempt to retransmit the TB associated with the indicated HARQ process ID. Once the WTRU retransmits the TB, and remaining PUSCH occasions are valid for the scheduled grant, the WTRU may transmit another TB with a different HARQ process ID (e.g., using a HARQ PID selected per any of the above-mentioned method(s) for HARQ PID selection). Alternatively, the WTRU may retransmit the same TB in different successive TTIs that are valid for the grant, but with different RVs and/or using the same HARQ process ID. In some cases, this may be further dependent on the content of the DCI.

In various embodiments, the WTRU may determine one or more timer values based on the timing of reception of a HARQ feedback trigger. In an example, the WTRU may receive control information (e.g., DCI) for one or more downlink transmissions. The control information may indicate to the WTRU that the WTRU may be triggered to report HARQ feedback at a later time. In such a case, the WTRU may pause some or all activity-based timers (e.g., until reception of the trigger for HARQ feedback). In some examples, activity-based timers may include at least one of: a timer to determine when to go to discontinuous reception (DRX), a timer to determine when to switch BWP(s) (e.g., switching to a default BWP), and a timer to determine when to deactivate an SCell. In an example, a WTRU may pause one or more activity-based timers until the reception of the HARQ feedback trigger signal. In another example, the WTRU may pause one or more activity-based timers until the timing of the triggered HARQ feedback transmission arrives. In yet another example, the WTRU may pause one or more activity-based timers (e.g., paused from the moment of receiving a DCI scheduling a DL transmission) until the successful completion of such scheduled transmission. For example, the WTRU may pause one or more timers if the WTRU has received a DCI for a PDSCH and the WTRU expects a second DCI for HARQ feedback, at least until the successful transmission of a HARQ feedback. In some cases, the WTRU may be configured with more than one resource on which to transmit HARQ feedback, and may only transmit on the earliest resource where LBT is successful.

In various embodiments, the WTRU may have multiple timer values or sets of timer values to be used for HARQ feedback. In some examples, the WTRU may determine or select a timer value (or a set of timer values) based on whether the HARQ feedback is indicated in the PDSCH scheduling DCI or whether the HARQ feedback is triggered in a later DCI. For example, the WTRU may use a first value (or a first set of values) if the HARQ feedback transmission resource is indicated in the PDSCH scheduling DCI, and the WTRU may use a second value (or a second set of values) if the HARQ feedback transmission resource is expected in a future DCI. In such examples, the timers may be triggered upon reception of the scheduling DCI, e.g., regardless of the timing of the HARQ feedback resource.

Upon expiration of one or more activity-based timers, the WTRU may perform an action prior to the time being scheduled for HARQ feedback transmission. For example, an inactivity timer (e.g., a BWP inactivity timer) may expire between the time period of reception of the PDSCH and reception of the HARQ feedback trigger. In such a case, the WTRU may switch BWPs to the default BWP. The WTRU may maintain the HARQ feedback bits or values, and may expect to receive a HARQ feedback transmission trigger in the new BWP, e.g., for PDSCH transmissions in a previously used BWP. If a first timer expires and the WTRU performs an action, the WTRU may reset or maintain other activity-based timers. For example, the WTRU may switch to a default BWP due to inactivity timer expiring.

In one embodiment, the WTRU may maintain one or more other timers (e.g., a DRX timer and/or an SCell deactivation timer). The timers used for other WTRU behaviors may be modified or configured to ignore the fact that the HARQ transmission feedback trigger has not been received by the WTRU. In another embodiment, the timers maintained for other WTRU behaviors may be maintained from those determined in a previous WTRU state (e.g., the previous BWP) and may thus depend on the knowledge or lack thereof of a HARQ feedback transmission resource.

In various embodiments, the WTRU may be triggered to report feedback on one or more BWPs and/or LBT subbands. For example, scheduling DCI and/or HARQ feedback triggering DCI may point to a set of resources on multiple BWPs and/or LBT subbands. This may improve channel access probability. Upon successful transmission on at least one resource, the WTRU may be configured to ignore all other HARQ feedback transmission resources, which are indicated for those HARQ processes and scheduled prior to the transmission of the HARQ feedback. For example, a WTRU may be rescheduled to transmit a HARQ feedback for a HARQ process for which it has previously transmitted the HARQ feedback. If the second request occurs after the original transmission of the HARQ feedback, the WTRU may not ignore it.

In various embodiments, the WTRU may keep all information regarding HARQ feedback at least until successful transmission of the HARQ feedback. For example, the WTRU may be granted resources for HARQ feedback, though the WTRU may not successfully acquire the channel for transmission on such resources. In such a case, the WTRU may keep the HARQ feedback information given that it may be triggered with new HARQ feedback transmission resource(s) for such HARQ processes, in the future.

REFERENCE

Each of the following references are incorporated by reference herein: (1) RP-172021, "Revised SID on NR-based Access to Unlicensed Spectrum", TSG RAN #77; (2) 3GPP TS 38.213, "Physical layer procedures", v15.0.0; (3) 3GPP TR 36.889, "Feasibility Study in Licensed-Assisted Access to Unlicensed Spectrum", v13.0.0; and (4) 3GPP TR 38.321, "Medium Access Control (MAC) protocol specification", v15.1.0.

CONCLUSION

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (e.g., but not always, in that in certain contexts the choice between hardware and software may become significant) a design choice representing cost vs. efficiency tradeoffs. There may be various vehicles by which processes and/or systems and/or other technologies described herein may be affected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of (or interchangeable with) any UE recited herein, are provided below with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WRTU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method implemented by a wireless transmit/receive unit (WTRU) for wireless communications, the method comprising:

determining, for a downlink (DL) transmission of a plurality of DL transmissions, a codebook process from a set of codebook processes based on a first indication associated with a codebook process index, wherein the DL transmission is associated with one or more hybrid automatic repeat request (HARQ) feedback bits;

receiving, in downlink control information (DCI), a second indication to transmit a set of HARQ feedback bits using one or more uplink (UL) control resources, wherein the second indication comprises at least the codebook process index and a HARQ retransmission indicator;

selecting the DL transmission from the plurality of DL transmissions based on: 1) the codebook process determined for the DL transmission, 2) the codebook process index, and 3) the HARQ retransmission indicator; and transmitting the set of HARQ feedback bits associated with the DL transmission using the one or more UL control resources.

2. The method of claim 1, further comprising:
receiving a respective DCI that schedules a respective DL transmission of the plurality of DL transmissions; and
determining, based on the respective DCI, the first indication associated with the codebook process index.

3. The method of claim 2, wherein the first indication associated with the respective codebook process index comprises a value of zero or one in a field from the respective DCI.

4. The method of claim 2, wherein the respective DCI is a first DCI, the received DCI is a second DCI, and the second DCI is different from the first DCI.

5. The method of claim 2, wherein the respective DCI comprises the received DCI.

6. The method of claim 1, wherein the second indication comprises a field in the DCI indicating a number of codebook processes for which HARQ feedback information is to be included.

7. The method of claim 1, wherein the second indication comprises any of: an UL resource indication associated with the respective codebook process, a DCI format, one or more bits in the DCI, a radio network temporary identifier (RNTI), or timing information of transmitting the set of HARQ feedback bits.

8. The method of claim 1, wherein the respective codebook process comprises HARQ feedback information for each respective DL transmission.

9. The method of claim 1, wherein the codebook process index is a field in the DCI indicating an index of a codebook process for which corresponding HARQ feedback information is to be included or transmitted.

10. The method of claim 1, wherein the one or more UL control resources comprise at least a physical uplink control channel (PUCCH) resource.

11. The method of claim 1, wherein each of the plurality of DL transmissions is a physical downlink shared channel (PDSCH) transmission.

12. A wireless transmit/receive unit (WTRU) for wireless communications, comprising circuitry, including a transmitter, a receiver, a processor, and memory, configured to:
determine, for a downlink (DL) transmission of a plurality of DL transmissions, a codebook process from a set of codebook processes based on a first indication associated with a codebook process index, wherein the DL transmission is associated with one or more hybrid automatic repeat request (HARQ) feedback bits;
receive, in downlink control information (DCI), a second indication to transmit a set of HARQ feedback bits using one or more uplink (UL) control resources, wherein the second indication comprises at least the codebook process index and a HARQ retransmission indicator;
select the DL transmission from the plurality of DL transmissions based on: 1) the codebook process determined for the DL transmission, 2) the codebook process index, and 3) the HARQ retransmission indicator; and
transmit the set of HARQ feedback bits associated with the DL transmission using the one or more UL control resources.

13. The WTRU of claim 12, wherein the receiver is configured to receive a respective DCI that schedules a respective DL transmission of the plurality of DL transmissions, and wherein the processor is configured to determine, based on the received respective DCI, the first indication associated with the respective codebook process index.

14. The WTRU of claim 13, wherein the first indication associated with the respective codebook process index comprises a value of zero or one in a field from the respective DCI.

15. The WTRU of claim 13, wherein the respective DCI is a first DCI, the received DCI is a second DCI, and the second DCI is different from the first DCI.

16. The WTRU of claim 13, wherein the respective DCI comprises the received DCI.

17. The WTRU of claim 12, wherein the second indication comprises a field in the DCI indicating a number of codebook processes for which HARQ feedback information is to be included.

18. The WTRU of claim 12, wherein the second indication comprises any of: an UL resource indication associated with the respective codebook process, a DCI format, one or more bits in the DCI, a radio network temporary identifier (RNTI), or timing information of transmitting the set of HARQ feedback bits.

19. The WTRU of claim 12, wherein the codebook process index is a field in the DCI indicating an index of a codebook process for which corresponding HARQ feedback information is to be included or transmitted.

20. The WTRU of claim 12, wherein the one or more UL control resources comprise at least a physical uplink control channel (PUCCH) resource.

* * * * *